INVENTOR.
ROSWELL H. HERRICK
BY
Chas. W. Candy
ATTORNEY

Feb. 17, 1953

R. H. HERRICK 2,629,092

MULTICHANNEL MOBILE TELEPHONE SYSTEM

Filed Dec. 31, 1948

6 Sheets-Sheet 2

INVENTOR.
ROSWELL H. HERRICK

BY

Chas. W. Candy

ATTORNEY

INVENTOR.
ROSWELL H. HERRICK
BY *[signature]*
ATTORNEY

INVENTOR.
ROSWELL H. HERRICK
BY
[signature]
ATTORNEY

Feb. 17, 1953 R. H. HERRICK 2,629,092

MULTICHANNEL MOBILE TELEPHONE SYSTEM

Filed Dec. 31, 1948 6 Sheets-Sheet 5

INVENTOR.
ROSWELL H. HERRICK

BY

[signature]

ATTORNEY

INVENTOR.
ROSWELL H. HERRICK
BY
[signature]
ATTORNEY

Patented Feb. 17, 1953 2,629,092

UNITED STATES PATENT OFFICE 2,629,092

MULTICHANNEL MOBILE TELEPHONE SYSTEM

Roswell H. Herrick, Lorain, Ohio, assignor to Automatic Electric Laboratories, Inc., Chicago, Ill., a corporation of Delaware Application December 31, 1948, Serial No. 68,545

30 Claims. (Cl. 343—176)

Figure 1:
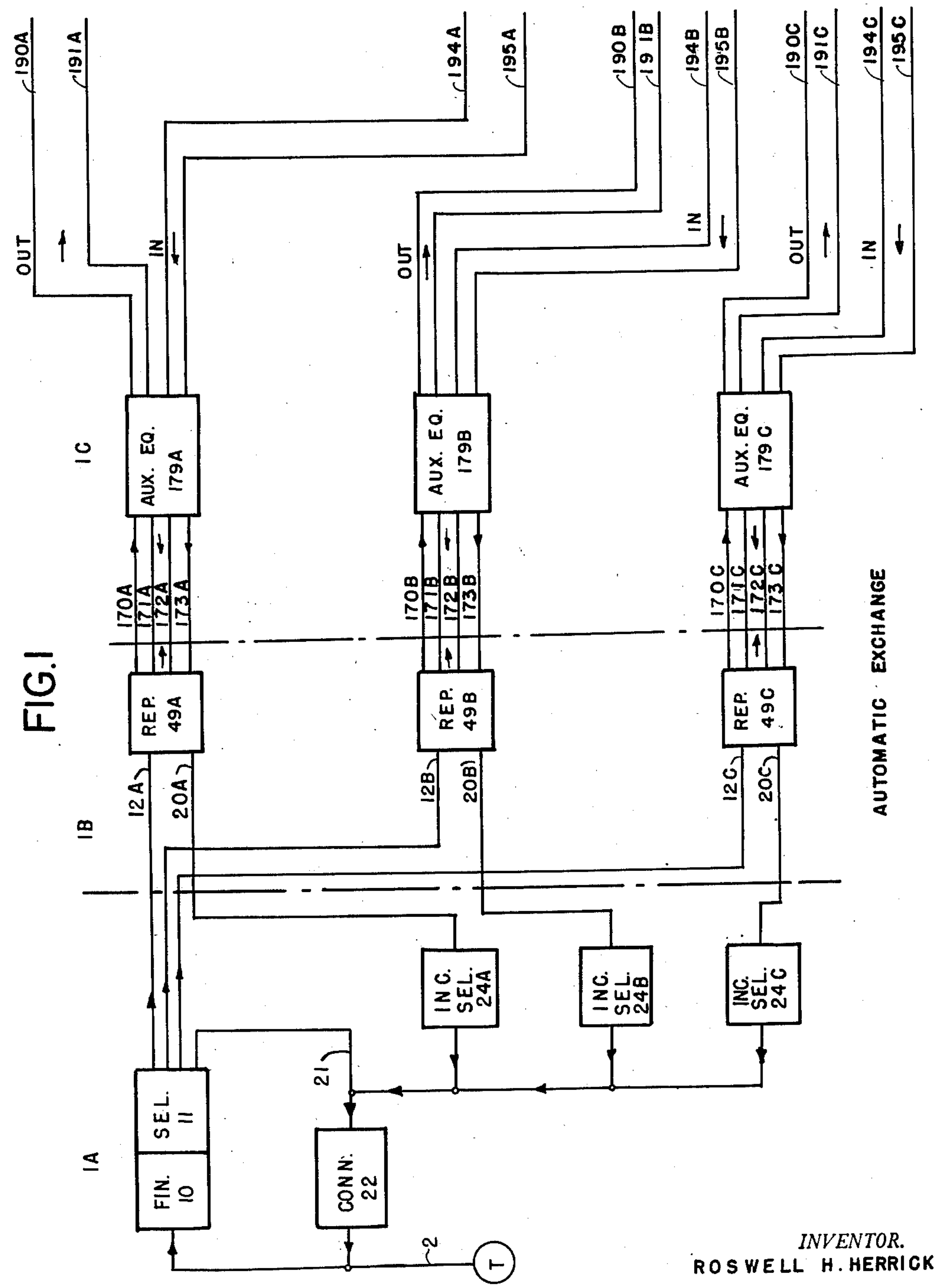

The present invention relates in general to mobile telephone systems or the like, in which radio transmitters and receivers are employed to complete telephone connections between any one of a first group of subscriber stations connected to a telephone exchange and any one of a second group of isolated subscriber stations not directly connected to said exchange, such as vehicles of any sort, and is an improvement on my co-pending application S. N. 55,627, filed October 10, 1948.

In the foregoing co-pending application there was disclosed a single-channel system of this type which was operated with a standard automatic telephone exchange, and in which connections were established in either direction by dialling the regular assigned directory number of the wanted subscriber station from the calling subscriber station, with provisions for full selective signalling and secret service in all cases. In that system, a single-channel radio receiver at each isolated station was tuned to the carrier of a single-channel radio transmitter common to said subscriber stations, and located in a radio control station associated with said exchange. A single-channel radio transmitter was also provided at each isolated station, all having a carrier of the same frequency, different from that of the carrier of the control station transmitter, while a single-channel radio receiver at the control station, and likewise common to all of said subscriber stations, was tuned to the common carrier of said isolated transmitters. All receivers were normally energized and ready to receive signals at all times, while the transmitters were maintained with filaments energized but without anode voltage, so that emission of the carrier wave of any transmitter required only the closure of the high voltage circuit thereto. On a call to an isolated station, seizure of the control station from the calling substation at the exchange was effected responsive to dialling of the first digit (or digits) of the wanted station's call number. Seizure of the control station automatically placed its carrier on the air, and caused dial tone to be returned to the calling party from the associated equipment. At each isolated station, receipt of the control carrier caused the operation of a relay thereat which prepared such station to receive impulses, prevented such station from initiating a call until termination of the current call, and prevented any but the called station from answering the current call. The control station, in response to the final digits of the call number, repeated these digits to the isolated stations in the form of 3000 and 2800 cycle modulations placed on the carrier one after the other at the start of each impulse in a definite timed relation, for operating a stepping switch at each isolated station, which resulted in the operation of visual and audible signals at the called station only. The called isolated party answered by removal of his handset, which automatically placed the carrier of his transmitter on the air. This automatically completed the connection and caused removal of the dial tone. On a call from an isolated station, removal of the handset at the calling station caused that station's transmitter to place its carrier on the air immediately. Receipt of this carrier at the control station caused the control station to again place its carrier on the air to lock out the other isolated stations. Receipt of the isolated station carrier also caused the control station to prepare to receive impulses, and to seize an incoming switch at the automatic exchange, which returned dial tone to the calling station. The calling subscriber then dialled the regular call number of the wanted exchange subscriber. Relays at the calling station repeated these digits to the control station in the form of 3000 and 2800 cycle modulations of its carrier just as for an outward call. The control station then translated these radio borne impulses into direct current pulses for operating the exchange switches to complete the call. Release of the control station was controlled by the last party to hang up on calls to an isolated station, but was controlled by the calling party on calls from an isolated station. An out-of-range timer was provided at each isolated station to take such stations off the air in case the control station carrier was not received back promptly following the initiation of a call at such station. A call timer was also provided at each isolated station to take such station off the air, on both outgoing and incoming calls, if not terminated within a given time limit.

The capacity of such a system, while not limited as to the number of fixed subscriber stations, is limited as to the number of isolated stations by traffic considerations, due to the single-channel character of the radio link, and the fact that only one conversation can take place over this link at a time.

The main object of the present invention is accordingly the provision of a multi-channel system of the same type, which would be inherently capable of serving a larger number of isolated or mobile subscriber stations than the single-channel system.

Another object of the invention is the provision of automatic tuning devices to keep the idle mobile stations tuned always to an available free channel, without attention from the mobile subscriber.

Another object of the invention is the provision of means whereby the mobile station equipment can distinguish automatically between an inward call and an outward call, so that re-tuning may be delayed on calls to a mobile station pending the dialling operation.

Another object of the invention is the provision of means whereby the mobile stations will automatically hunt the next available idle channel each time a busy channel is made free.

The main feature of the invention is therefore the employment of tunable radio transmitters and receivers at the mobile stations, and the provision of means responsive to the extension of a call in either direction over any one of said channels, for automatically tuning the remaining mobile stations to the next available idle channel, in this case, the lowest numbered free channel. At the control station, a separate transmitter and receiver, with associated control circuits, are provided for each channel.

Another feature of the invention is the use of a momentary splash of 3000 cycle modulating tone on the control station carrier at the time this carrier is first put on the air on a call to a mobile station, in order to hold the mobile stations on the calling carrier, whereas on a call from a mobile unit, the control station carrier is put on the air without modulation, thereby causing the remaining idle mobile stations to hunt a new channel at once.

Another feature of the invention is the provision of means for retuning each of the uncalled idle mobile stations to a new channel on an outgoing call to a mobile unit, upon receipt of the first digit thereat indicating that such station is not the called station, in order to reduce the lockout time as much as possible.

A further feature of the invention relates to means for automatically re-tuning a mobile unit to the correct standby channel upon the release of a connection involving such station, regardless of whether any other calls are in progress at the time or not.

Another feature relates to means at the mobile station for automatically tuning to the correct idle standby channel when the mobile set is first turned on, or is turned on again, after being turned off for a time for any reason.

Still another feature relates to means at the radio control station for remitting a splash of unmodulated carrier over certain of the channels when a call is released to re-tune all cars.

Other objects and features of the invention will also be apparent from the description and claims which follow, in conjunction with the appended drawings, comprising Figures 1 to 6, inclusive, which show in the usual circuit diagram form, sufficient of the equipment involved to enable the invention to be suitably described and readily understood.

Figure 1 illustrates in block diagram form a portion of the equipment at the telephone exchange.

Figure 2:
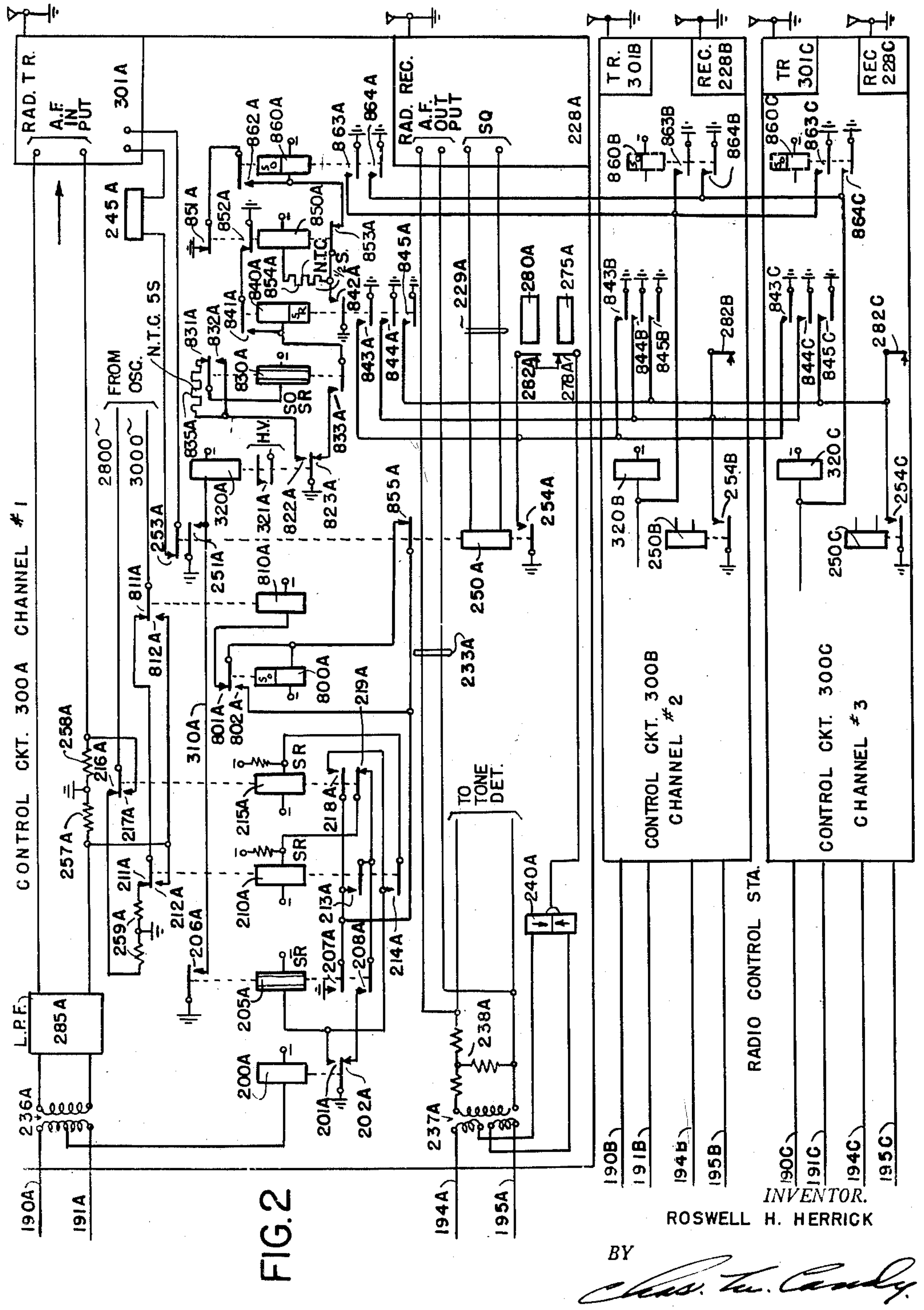

Figure 2, which goes to the right of Figure 1, shows in mixed block and circuit diagram form, the apparatus required at the radio control station.

Figures 3, 4, 5 and 6, when arranged with 4 and 6 above and below 3, respectively, and 5 to the right of 3, illustrate in circuit diagram form, the equipment required at one of the mobile stations.

Considering the drawings in greater detail, Figure 1 corresponds to Figures 1A, 1B and 1C of the previously indicated co-pending application; except that three outlet points and three inlet points to and from the radio link are provided, instead of only one. The equipment is otherwise identical to that previously described, and the same reference numbers have been retained, with the addition of suffix letters as required, to distinguish similar units of equipment associated with different points of access.

Thus, at the left in Figure 1, a fixed subscriber station T is shown connected over the line 2 to a connector switch 22 for receiving calls, and to a finder switch 10 for initiating calls, it being understood that these switches are part of a group of similar switches serving a group of lines. A finder distributor and a line circuit, shown in the original drawing, have been omitted, in the interests of simplification. Associated with each line finder 10 is a selector switch 11, forming therewith what is known in automatic telephony as a finder-selector link. The various switches employed are assumed to be two-motion stepping switches of the well known Strowger type, but almost any type of automatic switch in almost any type of automatic telephone system, would be equally satisfactory.

The selector 11 has access to connector 22, by way of a 3-conductor trunk 21, consisting of a pair of talking conductors and a test conductor, not shown, and has access to other connectors, not shown, over similar trunks, for making local calls. For outgoing calls over the radio link, the selector 11 also has access, over a group of 3-conductor trunks 12A, 12B and 12C, to the two-way trunk repeaters 49A, 49B and 49C, each of which is identical with Figure 1B of the stated prior application. For incoming calls over the radio link, the repeaters 49 have access over the associated 3-wire trunks 20A, 20B and 20C, to the incoming selectors 24A, 24B and 24C, which also have access to the connector 22 and the other connectors, not shown.

In the outward side, the repeaters 49 are connected in turn to the corresponding auxiliary equipment units 179A, 179B and 179C, each of which is identical with Figure 1C of the prior single-channel system. Each repeater is joined to its associated auxiliary unit over four conductors including a pair of two-way talking conductors 171A, B or C and 172A, B or C, a signal-out conductor 170A, B or C, and a signal-in conductor 173A, B or C. Means are provided in the repeaters for switching the talking conductors 171 and 172 from the trunks 12 to the trunks 20 as required, for sending ground pulses outward over the signal-out conductors 170, and for receiving incoming ground pulses over the signal-in conductors 173.

Each auxiliary equipment unit 179 is connected to a corresponding radio station control circuit 300A, B or C by four talking conductors, comprising a pair of outward talking conductors 190 and 191A, B or C, and a pair of inward talking conductors 194 and 195, A, B or C. In the auxiliary equipment units, these one-way talking pairs are connected, by means of a hybrid transformer, not shown, to the corresponding two-way talking pair 171—172. In the auxiliary equipment units also, the signal-out conductors 170 are connected, in simplex, to the corresponding outward talking pair 190—191, while the signal-in conductors 173 are connected, in similar fashion, to the corresponding inward talking pair 194—195.

Figure 3:
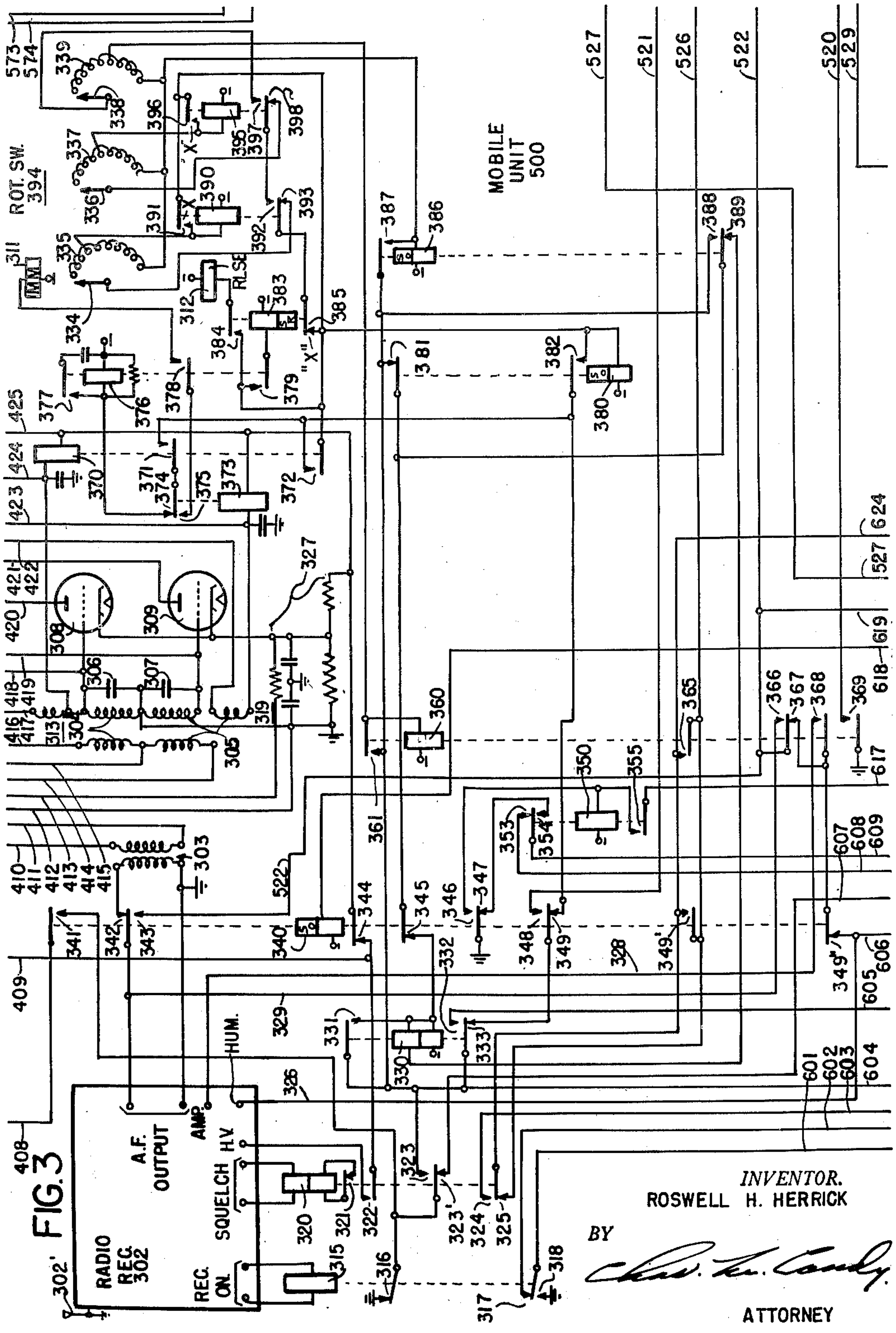

In Figure 2, illustrating the radio control station, a separate control circuit 300 is provided for each channel. Thus, control circuit 300A with its radio transmitter 301A and its radio receiver 228A, shown at the top of the sheet, is associated with channel #1, while the control circuits 300B and 300C, shown at the bottom of the sheet, are associated with the #2 and #3 channels, respectively. All of these circuits are identical with one another, and are likewise identical with the radio station control circuit of the aforementioned prior application, S. N. 55,627, filed October 10, 1948, as shown in Figures 2 and 3 thereof, except for the addition of six relays to send out the momentary 3000 cycle seizure tone on a call from the exchange, and to send out the splash of carrier upon the release of a connection. This modification, as indicated, in the partial circuit diagram shown for control circuit 300A, consists of two new relays 800A and 810A which serve to put out the 3000 cycle seizure tone, and four new relays 830A, 840A, 850A and 860A, which serve to put out the carriers on the release of a call. The seizure tone relays are operable from the existing contacts 207A of the hold relay 205A through a new pair of break contacts 855A which have been added to the existing squelch relay 250A. The carrier splash relays are operable from a new set of break-make contacts 822A and 823A which have been added to the existing transmitter control relay 320A. These latter relays are arranged to put out the #2 and #3 carriers for a brief interval at the end of each call, to re-tune all mobile stations, and also serve to busy all three channels at the exchange end at the same time, to prevent interference. Otherwise, the new and the old radio station control circuits are identical. For this reason, the upper part of Figure 2 herewith, shows only the outward and inward speech circuits connected to the transmitter 301A and the receiver 228A, and the control station end of the signal-out and signal-in circuits, together with the outward pulsing relays 200A, 205A, 210A and 215A, the remote control relay 240A, the squelch relay 250A, the inward pulsing relays 275A and 280A, the supervisory relay 245A, the transmitter control relay 320A, and the new relays 800A, 810A, 830A, 840A, 850A and 860A. Some of the contacts of the old relays have been omitted in the interest of simplicity. The new elements are also marked with special designation numbers in the 800 series to prevent possible conflict with previously assigned number designations.

Figure 3 illustrates a portion of the mobile unit control circuits, including the 3-channel radio receiver 302, at the upper left, a ratchet-driven, three-level, ten-point selector switch at the upper right, a tone detector and oscillator, in the upper center, and a number of relays. The receiver 302 is normally energized and ready to receive signals while the mobile equipment is in service. The relay 315, which is connected in the plate circuit of one of the receiver tubes, such as the output amplifier tube, is thus normally operated, as shown. The relay 320, which is connected to the "squelch" or "carrier-off-noise-suppression" circuit, operates responsive to receipt of a carrier from the fixed station at the frequency to which the receiver is tuned at the time, and restores responsive to removal of such carrier, or responsive to the re-tuning of the receiver to another channel. The audio frequency output of the receiver is normally connected to the transformer 303 and thence to the input side of the pulse tone detectors comprising the vacuum tubes 308 and 309 and their associated networks, while the plate voltage for these tubes is controlled from the squelch relay.

An impulse repeating circuit, comprising the relays 370, 373, 375 and 383, and controlled from the tone detector, repeats an impulse to the selector each time the 3000 and 2800 cycle impulse tones are received in the correct sequence, and in the proper time relation. The selector switch 394, comprising a motor magnet 311, a release magnet 312, and three wipers and associated contact banks 334, 335, 336, 337, 338, 339, is controlled in turn from the said impulse repeating circuit. Each mobile unit is assigned a different 3-digit call number, as compared to 2-digit numbers for the single-channel system, and the selector banks are so wired that only the mobile unit having the bank contacts wired to correspond with the digits dialled, will be signalled. The bank connections shown in Figure 3 are such that the relay 390 will be operated only if the first digit received is "4," the relay 395 will be operated only when the first two digits are "45," and the signal relay 360 will be operated only in response to the digits "456." Relay 360 controls audible and visual signals which serve to notify the called mobile subscriber of the incoming call. Of the remaining relays included in Figure 3, relay 330 is a re-searching relay which operates whenever an unmodulated carrier is received from the control station to cause the mobile unit to be tuned to a different frequency; relay 340 is a seizure relay controlled from the hookswitch, and which serves to put the mobile unit's carrier on the air both on the answering and initiation of calls; relay 350 is a tuner start relay, which operates from the seizure relay, and helps to control the re-searching operation at the conclusion of a call; relay 380 is a hold relay which operates whenever a modulated carrier is received from the control station, to delay the re-searching operation at the various mobile stations until the destination of the call has been indicated; and relay 386 is a kick-off relay which operates from the selector switch 394 as soon as any digit is received which does not agree with the assigned call number of the mobile station involved, and causes such station to be tuned to a new channel at once.

Figure 4:
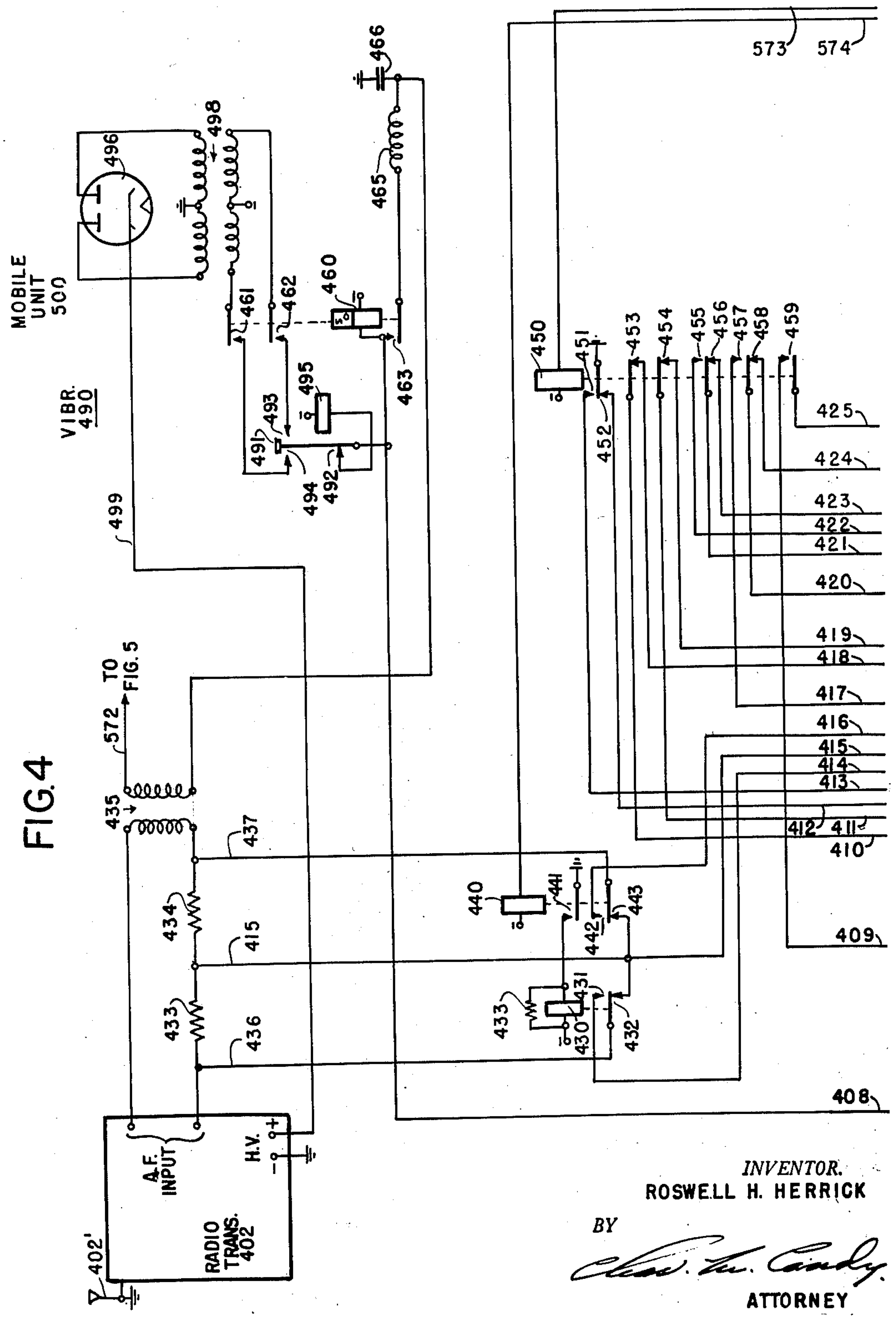

Figure 4 illustrates another portion of the mobile unit control circuits, including the 3-channel radio transmitter 402 at the upper left, and a vibrator-rectifier 490 at the upper right, for supplying plate voltage to the transmitter, as required. This vibrator set comprises a step-up transformer 493 and a rectifier tube 496, and an associated vibrator comprising an electro-magnet 495, a weighted reed 491, and the contacts 492, 493, 494. The vibrator set 490 is put into operation under control of the hookswitch when the mobile subscriber removes his handset to initiate or to answer a call. The power relay 460 operates at the same time to connect up the transformer 498. The relay 450 is an adapter relay controlled from the dial 510 to convert the tone detector circuit comprising the tubes 308 and 309 and their networks into tone oscillator circuits for generating the 3000 and 2800 cycle tones required for pulsing from the mobile unit. The relays 440 and 430 are pulsing relays controlled from the dial impulse springs for applying the oscillator output to the radio transmitter input in the required manner. The transformer 435, in the upper center of Figure 4, connects the radio transmitter input circuit also to the telephone transmitter of the handset 501 for the transmission of speech.

Figure 5:
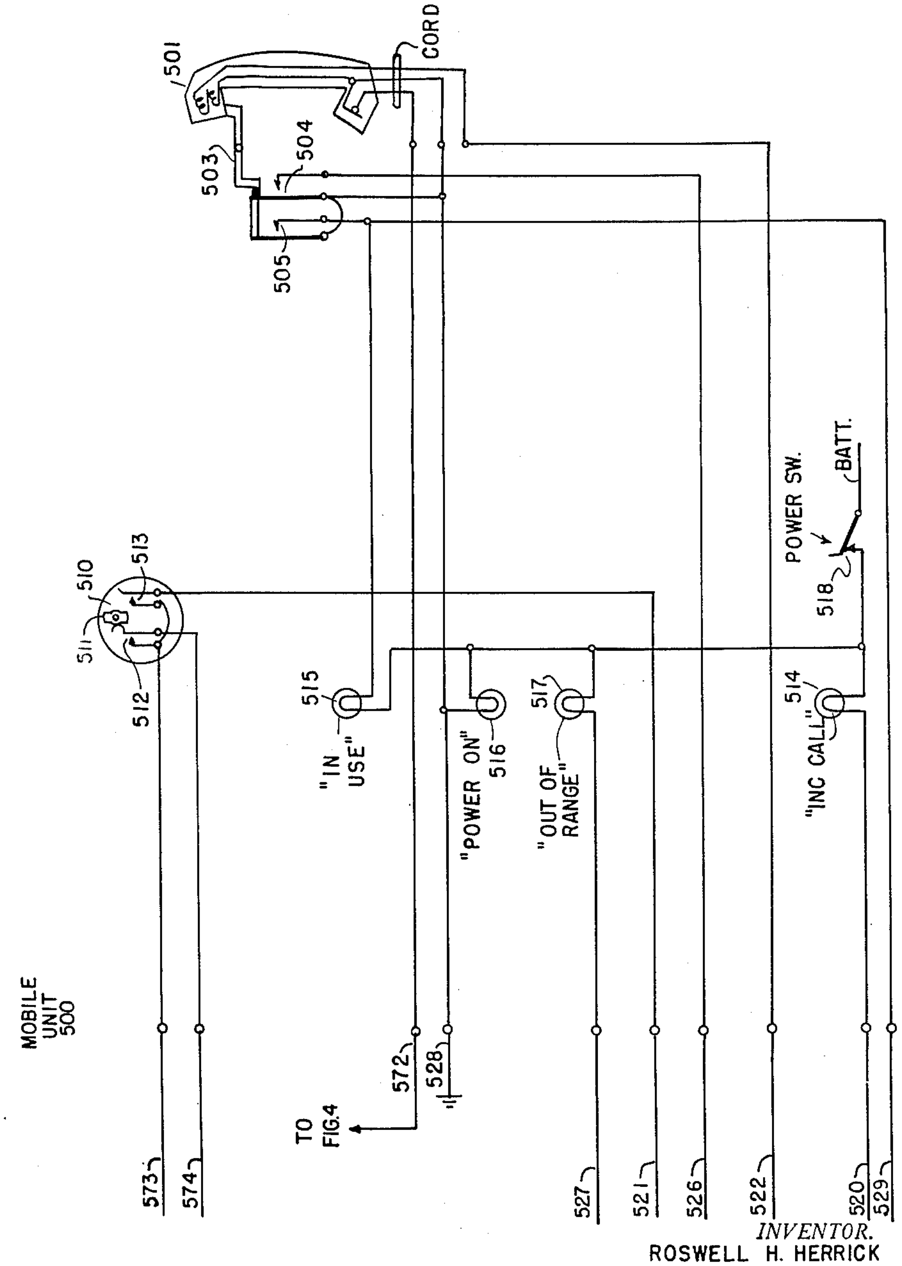

Figure 5 shows the dash control apparatus, including a telephone handset 501, an associated hookswitch 503, a telephone dial 510, a power switch 518, and a number of signal lamps. The power switch 518, which is normally closed as long as the mobile unit is in service, connects battery to the control circuits, fully energizes the radio receiver, and energizes the filament circuits of the radio transmitter. The "power-on" signal lamp 516 is illuminated as long as the switch 518 is closed. The "incoming call" lamp 514 lights whenever the associated mobile station has been selected by a call from a fixed station, and the "in use" lamp 515 lights whenever the handset is removed from the hookswitch. The signal lamp 517 will light in case the mobile subscriber attempts to initiate a call while beyond the range of the fixed control station's carrier.

Figure 6:
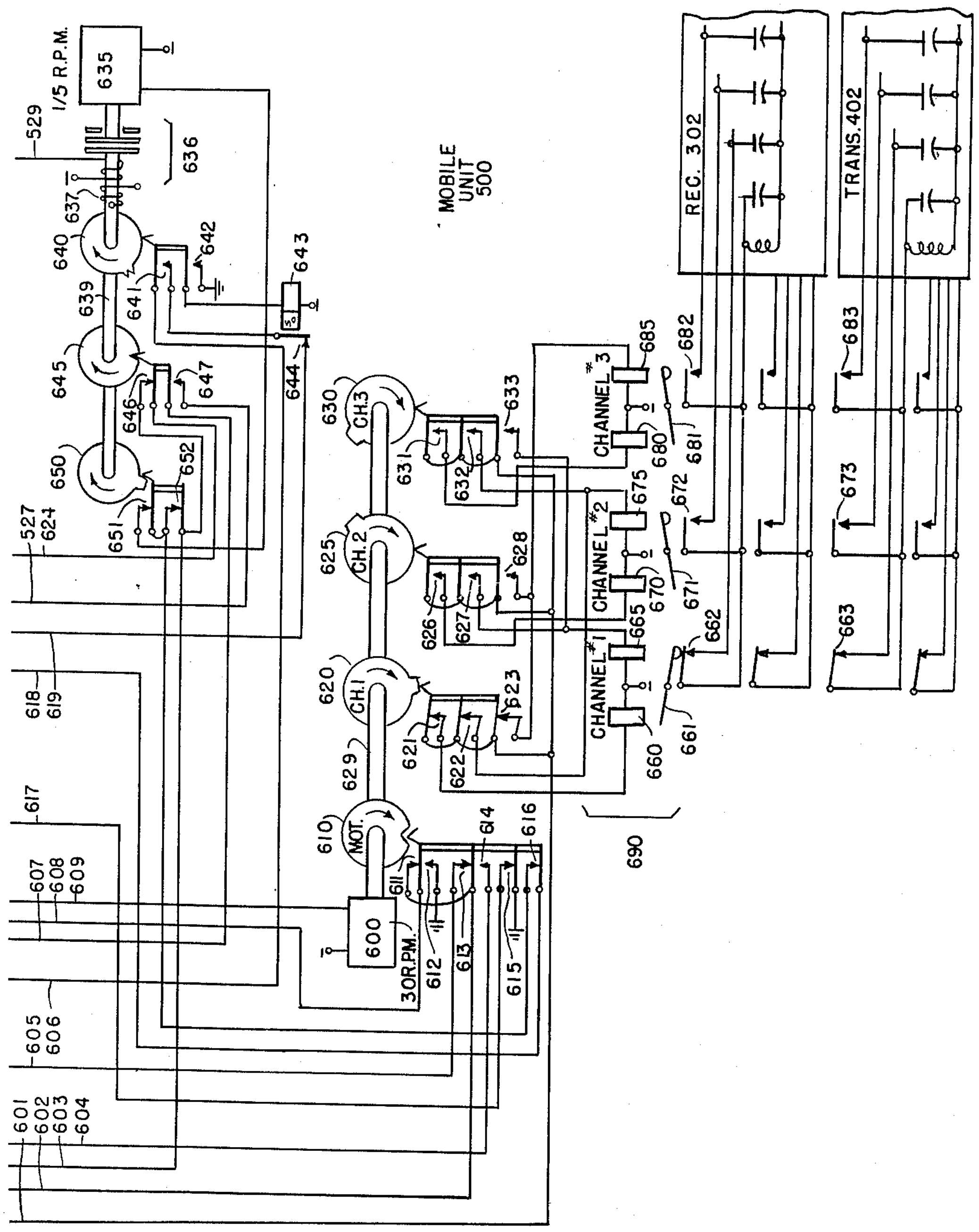

In Figure 6 are shown a cam controlled out-of-range and call-timer, and a cam controlled tuning apparatus for re-tuning the mobile unit's transmitter and receiver to a new channel as required. The out-of-range and call-timer, shown at the upper right, comprises a motor and gear reduction unit 635, a shaft 639 mounting three cams 640, 645 and 650, a magnetic clutch 636, and a slow-to-operate relay 643. In this timer, which is controlled from the hookswitch, the out-of-range cam 645 is arranged to take the mobile station off the air in case the control station carrier is not received back promptly following the initiation of a call by the mobile subscriber. The cams 640 and 650 which constitute the call timer, are arranged to interrupt all outward or inward calls after 5 minutes and to give a warning signal after 4½ minutes, or after any other predetermined time, dependent upon the setting of the cams and the speed of the shaft.

The retuning apparatus shown in the lower part of Figure 6, consists of a motor and gear reduction unit 600, a shaft 629 for said motor mounting four cams 610, 620, 625 and 630, and a three-channel tuning device 690. The motor 600 is started by the local control circuits whenever re-tuning of the mobile radio units is necessary, the cams 620, 625 and 630, and their associated spring contacts, control the tuning magnets 660, 670 and 680, and the tuning release magnets 665, 675 and 685, while the cam 610 assures a complete revolution of the tuning cams, each time the motor 600 is started.

The general description of the system, and of the apparatus involved as shown on the drawings having been completed, a detailed description of the circuit operation will now be given, by tracing the extension of a call in each direction over the network, in order to facilitate the complete understanding of the invention. It will be understood, of course, that the embodiment of the invention shown and described is not the sole embodiment nor necessarily the preferred embodiment, and that various changes and modifications, such for example, as the use of more or fewer channels, may be made, without going beyond the breadth and scope of the invention.

EXCHANGE SUBSCRIBER CALL TO MOBILE UNIT

*Seizure of a radio channel*

Let it be assumed that the subscriber "T" at the automatic exchange of Figure 1, desires to make a call to a mobile unit, such as the mobile unit 500 shown in Figures 3, 4, 5 and 6. The subscriber T accordingly removes the handset from his telephone, which is assumed to be included in the circle T, to initiate the call in the usual manner. Responsive to removal of the handset at the calling telephone, an associated line circuit, not shown, at the exchange end of the subscriber line 2 is operated. This line circuit accordingly makes the line 2 busy to all of the connector switches such as the connector 22 having access thereto, and causes line 2 to be seized by an idle line-finder such as the finder 10 in the group of finders associated with this line. The finder then immediately switches the calling line through to the associated selector switch 11, which returns dial tone and clears the line circuit from the calling line, in known manner.

Upon hearing the dial tone, the calling subscriber at the substation T now dials the first digit of the call number, to select the radio level. The selector 11 is thereby operated to the desired level, and hunts automatically therein, in known manner, to find an idle trunk. In a 3-channel system such as illustrated, there would be three trunks on the radio level, and it will be assumed that trunk 12A representing channel #1, is connected to the 1st position in the level, trunk 12B representing channel #2 to the 2nd position in the level, and trunk 12C representing channel #3 to the 3rd position.

If the first channel is free, the repeater 49A will be idle, and will be so marked at the selector 11, over the test conductor of the trunk 12A. The selector 11 will accordingly stop on the first contacts of the level, and extend the calling line to the repeater 49A. The repeater 49A, in response to such extension, grounds its test conductor to hold the link 10—11, and to mark itself as busy in the banks of the other selectors having access thereto. The repeater 49A at the same time extends the calling line to the talking conductors 171A and 172A leading to the auxiliary equipment 179A, and thence to the control circuit 300A over the outward and inward talking pairs 190A, 191A and 194A, 195A. The repeater 49A furthermore, grounds the signal-out conductor 170A, which ground passes over conductors 190A, 191A in parallel to the repeating coil 236A in the control circuit, and thence to the line relay 200A, which operates.

Line relay 200A, upon operating, as stated, over the outward simplex control circuit, at its contacts 201A closes an obvious circuit to hold relay 205A, which has been made slow to release by the use of a copper sleeve over its core. Hold relay 205A operates, and at its contacts 206A grounds conductor 318A for operating the transmitter control relay 320A. Relay 320A upon operating, at its contacts 822A closes a circuit for relay 830A. Relay 830A, which is made slow to release by means of a copper sleeve on the core, is also given an operate time delay of some 5 seconds by being connected in series with a self-heating resistor 835A made of a negative temperature coefficient resistance material. As the resistor heats, its resistance drops, and the current increases steadily until it reaches a value sufficient to operate the relay, the relation being such in the present instance, that the relay 830 will operate after approximately 5 seconds, lock itself direct to contacts 822A, disconnect resistor 835A, and prepare a circuit for relay 840A. Relay 320A further, at its contacts 321A applies plate voltage to the tone oscillators, not shown, and to radio transmitter 301A. The oscillators thereupon start operating, to generate the 3000 and 2800 cycle modulating tones, and the transmitter 301A, responsive to the application of plate voltage thereto, puts its carrier on the air.

Hold relay 205A also, at its contacts 207A energizes relays 800A and 810A in parallel as follows: ground at contacts 207A, contacts 855A, relay 800A, contacts 801A, and relay 810A. The seizure tone cutoff relay 800A, being made slow to operate by the use of a long copper slug on the armature end of the core, does not operate immediately, but the seizure tone relay 810 does operate. Relay 810A thereupon at contacts 811A opens the normal oscillator load circuit through the right resistor 259A, and at contacts 812A connects the 3000 cycle oscillator output across the resistor 257A, which is in series with the audio frequency input circuit of the transmitter 301A. The 3000 cycle tone from this oscillator, not shown, is thereby impressed upon the carrier of the transmitter 301 as a modulation thereof, in known manner. Cut-off relay 800A then operates, after a delay of some 100 milliseconds, and at contacts 802A locks itself operated to the ground at contacts 207A. Relay 800A also, at contacts 801A, causes the release of relay 810A. Relay 810A restoring, removes the 3000 cycle modulation from the carrier, and restores the original circuit to resistor 259A. The energization of the high voltage circuits of the transmitter 301A also causes operation of the supervisory relay 245A through contacts 253A of the squelch relay, and relay 245A, by contacts, not shown, connects ground and battery to the secondary of the repeating coil 237A and so to the inward talking conductors 194A and 195A for the operation of a relay not shown, in the auxiliary equipment unit 179A, which returns a second dial tone to the calling subscriber T, over the talking conductors 171A and 172A, the outgoing trunk 12A and the line 2.

Responsive to transmission of the carrier of the fixed radio transmitter 301A, all of the mobile station radio receivers that are tuned to this channel, which will include all those not already occupied with a call, will respond to this signal. In the mobile unit 500 for example, assuming it to be free at this time, upon receipt of the carrier thereat, the squelch circuit, not shown, in the radio receiver 302, causes the energization of the squelch relay 320. Relay 320 being made slightly slow to operate by means of a short circuited lower winding normally closed through break contacts 321, operates after a delay of a few milliseconds. Relay 320 thereupon at its contacts 321 disconnects its lower winding and at its contacts 322 connects plate voltage from the receiver 302 to the tone detector tubes 308 and 309, by way of contacts 344, relays 373 and 370, conductors 423 and 424, and contacts 456 and 458. Squelch relay 320 also, at its contacts 323 grounds various points in the mobile station control circuits, at its contacts 325 opens the call initiating circuit from the hookswitch and conductor 526, and at contacts 324 prepares the call answering circuit, which, however, can be completed only at the called station, as will be seen. Contacts 323 also extend ground to relay 330, by way of contacts 381 and 345. Relay 330 is provided with an operate time delay of some 50 milliseconds, however, by the use of a normally short circuited winding on the armature end of its coil, and does not operate immediately. This short circuit includes the contacts 345 and 389.

Responsive to transmission over the carrier of the stated splash of 3000 cycle seizure tone, which appears at the antenna 302′ just prior to the operation of the squelch relay 320, the radio receiver 302 causes an equivalent tone of this frequency to appear across its audio frequency output circuit, which is connected through contacts 342 to the primary of transformer 303. The 3000 cycle tone is thereby induced into the secondary of transformer 303 and thence to the tuned circuits 313 and 319, over conductors 410 and 411, contacts 453 and 454, and conductors 418 and 419. The tuned circuit 313, comprising the condenser 306 and transformer 304 is tuned to select the incoming 3000 cycle tone and apply it to the grid of the associated tube 308. The tuned circuit 319, comprising the condenser 307 and transformer 305, is tuned for 2800 cycles and does not respond to the 3000 cycle tone.

The tubes 308 and 309 normally have their grids biased close to cut-off, so that when the 3000 cycle voltage is caused to appear on the grid of the tube 308 by the tuned circuit 313, the tube conducts sufficiently for the operation of the impulse repeating relay 370, which is connected in its plate circuit over conductor 420, contacts 458, conductor 424, winding of relay 370, and resistance bank 327 to the tube's cathode. Relay 370 upon operating, at its contacts 372 completes a circuit to hold relay 380 as follows: ground through contacts 316, 323, 333, 349 and 372 to relay 380. Relay 380, which is made slightly slow to operate by means of a short copper slug over the armature end of its core operates after a brief delay, and at contacts 382 locks direct to the ground through contacts 349. Relay 380 also, at its contacts 381 opens the circuit to re-searching relay 330, before the latter has had time to operate.

Meanwhile the closure of contacts 371 on the impulse repeating relay 370, has also caused operation of relay 376, from the same ground through contacts 349, over contacts 371 and 374. This in turn causes the operation of relay 383 from the same ground, through contacts 372 and 379. Relay 383 at contacts 384 extends the same ground to release magnet 312 which also operates. This is without effect, however, and upon removal of the 3000 cycle seizure tone, when relay 370 restores, relays 376 and 383, and release magnet 312 also restore, while relay 380 remains operated over its locking contacts 382.

*Selecting mobile unit*

Assuming that the calling subscriber at the fixed substation T is calling the illustrated mobile unit 500, he will upon hearing the second dial tone, proceed to dial the remaining digits of the call number, in this case "456," as previously explained.

Responsive to the dialling of the first digit "4" the line loop to the repeater 49A is opened and re-closed four times, thereby causing a line relay, not shown, in the repeater, to release and re-operate four times. This in turn opens and closes the outward simplex control circuit over conductors 170A and conductors 190A and 191A to line relay 200A in the control station, which relay also restores and re-operates four times. At each release of relay 200A, contacts 201A thereof momentarily open the circuit of hold relay 205A which is not affected, however, due to being made slow to release. At each release of relay 200A also, contacts 202A close a circuit to pulsing relay 210A by way of contacts 208A and 219A. Relay 210A thereupon operates, at contacts 213A closes a holding circuit for itself, at contacts 214A prepares a circuit for pulsing relay 215A, and at contacts 212A connects the 3000 cycle modulation tone from contacts 811A to the resistor 257A and the input circuit of the transmitter 301A, whereby it is again superimposed on the carrier, as a modulation thereof.

At each reoperation of line relay 200A on the other hand, contacts 202A open the original operate circuit for relay 210A, now locked to contacts 207A, while contacts 201A re-close the circuit of relay 205A, and connect ground to pulsing relay 215A over contacts 214A. Relay 215A thereupon operates, and at contacts 218A locks to ground at contacts 207A, through contacts 218A and 214A. Relay 215A also at contacts 219A opens the locking circuit to pulsing relay 210A, and at contacts 217A connects the 2800 cycle modulation tone to the resistor 258A and the input of the transmitter 301A, whereby it is likewise superimposed on the carrier as a second modulation thereof. Pulsing relay 210A, being made slightly slow to release by the use of a non-inductive shunting resistor, holds its armature for a brief interval following the opening of its locking circuit, so that both tones are on the carrier for a short time. Relay 210A upon restoring, removes the 3000 cycle tone, and at contacts 213A and 214A further opens its own locking circuit and opens the locking circuit of relay 215A. Relay 215A accordingly also restores after a similar brief delay, to remove the 2800 cycle tone, and to re-prepare the operate circuit to relay 210A, in readiness for the next impulse. The succeeding digits act in the same manner, the only difference being in the number of impulses.

In the mobile unit 500, as in the other mobile units not shown, the first pulse of 3000 cycle tone is passed from the radio receiver 302 through transformer 303 as before to the detector tuned networks 313 and 319, where it is picked off by the network 313 and applied to the grid of tube 308. The tube 308 again conducts and operates its plate relay 370. Relay 370 upon operating, at its contacts 371 again operates pulsing relay 376 from the ground at contacts 316, through contacts 323, 333, 349, 371, 374. Relay 370 also, at contacts 372 closes the operate circuit to hold relay 380, but this has no effect at this time as relay 380 is now locked operated. Relay 376 upon operating, at its contacts 378 prepares a circuit to the selector switch motor magnet 311, and at its contacts 379 passes the ground from contacts 372 to the release relay 383. Relay 383 upon operating, at its contacts 385 opens the selector switch wiper circuit, and at contacts 384 passes multiple ground from contacts 372 and 382 to the selector switch release magnet 312, which also operates. The release magnet 312 upon operating engages a holding pawl with the driving ratchet, not shown, in order to hold the ratchet in place as it is advanced by the motor magnet 311.

The first pulse of 2800 cycle tone, which arrives at about the mid-point of the first dialled impulse, now appears at the antenna 302′ and is passed through the receiver 302 to the transformer 303. There, it is passed by induction to the detector tuned networks 313 and 319 over the conductors 410 and 411, contacts 453 and 454, and conductors 418 and 419. Since the network 319 is resonant at this frequency it causes the 2800 cycle signal to be applied to the grid of the tube 309. The tube 309 thereupon is made conductive and operates the impulse repeating relay 373, which is connected in its plate circuit, over conductor 421, contacts 456, conductor 423, winding of relay 373, and resistor bank 327 to the tube's cathode.

Plate relay 373 upon operating, at its contacts 374 opens the circuit to pulsing relay 376, which however, is made slow to release, by the use of a shunting non-inductive resistor and a condenser, and holds its armature for a brief interval. Plate relay 373 also at its contacts 375 passes ground from make contacts 371 to the stepping magnet 311, by way of contacts 378. Stepping magnet 311 thereupon operates and advances the driving ratchet, not shown, and the associated wipers 334, 336 and 338 one step, thereby causing the wipers to engage the first contact in each level of the contact bank.

The plate relays 370 and 373 are both held operated for an interval somewhat exceeding the operate time of the stepping magnet 311, whose circuit is opened by the removal of the 3000 cycle tone. Upon removal of this tone, plate relay 370 restores, and at contacts 371 opens the circuit to magnet 311 which restores. Relay 370 also at contacts 372 removes one of the multiple grounds from release relay 383, still held from contacts 382. Upon removal of the 2800 cycle tone shortly thereafter, plate relay 373 also restores, and further opens the circuit to the stepping magnet 311. Pulsing relay 376, which restores at approximately the same time or shortly thereafter, now opens the circuit to the release relay 383, at contacts 379. Relay 383 is made slow to release, however, by the use of a long copper slug on the heel end of the core, and maintains its armature operated during the pulsing. The release magnet 312 is therefore also held operated, from the ground through contacts 382 on the hold relay and contacts 384 on the release relay.

Relays 370, 373 and 376 operate similarly in response on the succeeding impulses of the first digit, and cause the stepping magnet 311 to advance the wipers of the selector switch four steps to the #4 contacts of the bank. Upon the cessation of the pulsing, the relays 370, 373 and 376 remain at normal, and thereby permit release relay 383 to restore, after the expiration of its delay period. Release relay 383 upon releasing closes its break contacts 385 before opening its make contacts 384. Closure of the contacts 385 completes a circuit to transfer relay 390, from the ground at contacts 382, through contacts 385 and 393, wiper 334, and contact #4 in the bank level 335. Contacts 384 on the release relay then open, and open the circuit to release magnet 312. The release magnet 312 then restores, and disengages the holding pawl from the ratchet. The switch is thereupon restored to its normal position by means of a restoring spring, not shown. The transfer relay 390 upon operating, at its make-first contacts 391 locks itself operated to ground from contacts 382, and at contacts 392 and 393 switches the wiper circuit from the wiper 334 to the wiper 336.

Upon the dialling of the second digit "5" the relays 370, 373, and 376 are caused to operate similarly, with release relay 383 and release magnet 312 operating as before on the first impulse, and remaining operated until shortly after the last impulse of the series. The stepping magnet 311 is therefore operated and released five times instead of four, and advances the wipers quickly to the #5 contacts in the bank. When, therefore, release relay 383 restores, shortly after the last impulse of the series, during the inter-digital pause, the quick-closing break contacts 385 thereon complete a circuit to transfer relay 395, from the ground at contacts 382, through contacts 385, 392 and 398, wiper 336, and contact #5 in the bank level 337. Relay 395 accordingly operates and locks, and at contacts 397 and 398 transfers the wiper circuit from wiper 336 to wiper 338. The switch then releases, due to the opening of contacts 384 of the release relay and the resulting restoration of the release magnet 312.

Upon the dialling of the final digit "6," the action is again similar, and the stepping magnet 312 is accordingly operated and released six times, to advance the wipers to the #6 contacts in the bank. When now, release relay 383 restores as before, shortly after the last impulse, it closes a circuit to the signal relay 360, from the ground at contacts 382, through contacts 385, 392, 397, wiper 338, and contact #6 in the bank level 339. Relay 360 operates over this circuit, and the selector switch then releases as before.

The signal relay 360 upon operating, at its contacts 361 locks itself operated direct to ground at contacts 323 of the squelch relay, at its contacts 365 prepares the answer circuit, which is thus made operative only at the called mobile station, at its contacts 369 closes a circuit for lighting the "incoming-call" signal lamp 514 over conductor 520, and at contacts 366 and 367 completes an audible signal circuit. This latter circuit, which may originate in any convenient source of audible tone, and is here considered as a tap on the vibrator side of the radio receiver high voltage rectifier unit, not shown, passes over conductor 326, through contacts 349'' and 368, conductor 328 to the input side of the output amplifier circuit not shown, in the receiver 302, which amplifies the tone to a high level and impresses it on the receiver's audio frequency output circuit, from where it is passed over conductor 329, contacts 366, and conductor 522, through the receiver of the handset 501 to ground. The handset receiver thereupon converts the tone into a loud audible signal easily heard by the called mobile subscriber.

*Mobile subscriber answers*

The called mobile subscriber, responsive to the audible and visual signals received, answers the call by removing the handset 501 from the hookswitch 503. The hookswitch contacts 505 thereupon close a circuit to the "in use" lamp 515 from ground on conductor 528, through contacts 505 and lamp 515 to battery at the power switch 518. Contacts 505 at the same time extend the same ground over conductor 529 to the timer clutch 636. The lamp 515 accordingly lights, and clutch 636 operates and connects the cam shaft 639 to the timer motor 635. The hook switch contacts 504, which close at the same time, extend the ground from conductor 528 to the seizure relay 340, over conductor 526, contacts 365 and 324, conductor 603, contacts 652 and 616, and conductor 618 to relay 340. A branch of this circuit also extends from contacts 365 over conductor 624 to contacts 651 and 646. At contacts 651, this multiple ground is further extended to the timer motor 635, which thereupon starts driving the shaft 639 and the associated cams in a clockwise direction. Cam 645, shortly thereafter, opens contacts 646, which remove one of the shunts across the contacts 651 and 652.

The seizure relay 340 operates, and at its contacts 341 closes the start circuit to the high voltage vibrator 490, over conductor 408, from direct ground at contacts 316. Relay 340 also, at contacts 342 disconnects the audio frequency output circuit of the radio receiver 302 from the transformer 303, and at contacts 343 connects the said output circuit to the handset receiver, over conductor 522. Relay 340 also, at its contacts 344 disconnects plate voltage from the tone detector, at contacts 345 opens another point in the operate circuit for relay 330, at contacts 346 operates relay 350 which locks to ground at contacts 615 of the tuner, at its contacts 349 opens the locking circuit of the relays 380, 390 and 395 which restore, and at its contacts 349'' opens the audible signal circuit.

Upon the grounding of the vibrator start conductor 408, from contacts 341, power relay 460 is energized. This relay is made slow to operate, however, by means of a long copper slug on the heel end of its core, and does not operate its contacts for a period of some 100 milliseconds. Meanwhile, the start ground on conductor 408 has also passed through contact 492 on the vibrator to the electromagnet 495 which attracts the reed 491. The reed 491 thereupon closes contact 493 and opens contact 492. The opening of contact 492 opens the circuit to magnet 495, whereupon the weighted reed 491 is released and swings back to close contacts 494 and re-close contacts 492. The magnet 495 is thereby re-energized and again attracts the reed 491. This action continues as long as ground is held on the start conductor 408, with the swinging reed 491 alternately grounding the contacts 493 and 494.

Upon operation of the power relay 460, contacts 463 on this relay energize the transmitter of the handset 501 in series with the primary of the transformer 435 over the following circuit: negative battery through relay 460, contacts 463, choke coil 465, primary winding of transformer 435, conductor 572 to Figure 5, and the handset transmitter, to ground on conductor 528. Power relay 460 also, at its contacts 461 and 462 connects the primary windings of the step-up transformer 498 to the contacts 493 and 494. Thenceforth, each time the weighted reed 491 closes the contact 493 it energizes the right-hand primary winding of transformer 498, and each time it grounds the contact 494 it energizes the left-hand winding. High alternating voltages are thereby induced alternately in the secondary windings of the transformer 498, each half wave being passed in turn through the rectifier tube 496, and appearing as a high pulsating positive voltage on the conductor 499 leading to the radio transmitter 402, where it is smoothed out by a suitable filter and applied to the plate circuits, not shown. Responsive to the application of the high voltage to the mobile unit's radio transmitter 402, the latter, which is tuned to the #1 channel, places its #1 carrier on the air.

Radio receiver 228A at the radio control station, which is permanently tuned to the mobile units' #1 carrier, responds to this signal, and operates its squelch relay 250A, over the conductors 229A. Relay 250A thereupon, at its contacts 251A connects a second ground to relay 320A, to maintain the high voltage to transmitter 301A and hold its carrier on the air independently of contacts 206A, which were closed as previously explained when the control circuit 300A was first seized by the calling fixed subscriber T. Relay 250A also, at its contacts 253A releases supervisory relay 245A, which in turn at contacts not shown, removes the previously applied ground and battery from the inward talking conductors 194A and 195A, thereby causing the release of the previously operated dial tone relay, not shown, in the auxiliary equipment unit 179A. Relay 250A further, at contacts 855A opens the original operate circuit to the cut-off relay 800A, and at contacts 254A completes the inward simplex control circuit extending from ground at contacts 254A, through contacts 282A and 276A on the inward pulsing relays, both windings of relay 240A in parallel, conductors 194A and 195A in parallel, both windings in parallel of the dial tone relay, not shown, at the auxiliary equipment unit, and over the signal-in conductor 173A to a signal-in relay, not shown, in the repeater 49A. The dial tone relay and relay 240A whose windings are opposing when energized in parallel, do not operate in this circuit, but the signal-in relay, not shown, in repeater 49A does operate, and causes reversal of the battery feed to the calling line in the usual manner, for recording and/or supervisory purposes as required.

A complete two-way talking connection is now established between the calling subscriber at the fixed substation T and the called subscriber at the mobile station 500. The outward talking circuit extends from the calling subset T over its line 2, through the finder-selector link 10, 11, the trunk 12A, repeater 49A, conductors 171A and 172A, auxiliary equipment 179A, conductors 190A and 191A, repeating coil 236A and filter 285A to the input terminals of the radio transmitter 301A, whereby the outward speech frequencies are impressed upon the carrier thereof and transmitted to the radio receiver 302 in the mobile unit 500, where they are amplified and impressed across the output circuit of the receiver, and thence over the contacts 343 and conductor 522 to the telephone receiver in the handset 501. The inward talking circuit extends from a local circuit including the telephone transmitter in the handset 501, conductor 572, the primary of transformer 435, and condenser 466, through the transformer 435 to the input terminals of the radio transmitter 402, whereby the inward speech frequencies are impressed upon the carrier thereof and transmitted to the radio receiver 228A at the control station, where they are amplified and impressed across the output conductors 233A, from where they pass through the "T" network 238A, repeating coil 237A, conductors 194A and 195A, auxiliary equipment unit 179A, conductors 171A and 172A, repeater 49A, trunk 12A, link 10, 11, and over line 2 to the substation T.

*Normal release*

If the calling fixed subscriber T hangs up first, at the conclusion of the conversation, the replacement of the receiver or handset at the substation T opens the calling line loop to the repeater 49A, thereby releasing the repeater line relay, not shown, which removes ground from the signal-out conductor 170A, but does not release the repeater. The line relay 200A at the control station also restores, and at contacts 201A opens the circuit to hold relay 205A. Relay 205A being slow to release, remains operated for an instant however. During this time contacts 202A close a circuit through contacts 208A and 219A to pulsing relay 210A which operates. Relay 210A thereupon at its contacts 212A puts the 3000 cycle modulating tone on the air for a brief interval. Relay 205A then restores, and at contacts 207A and 208A opens the operate and locking circuits to relay 210A which restores, and removes the 3000 cycle tone from the carrier. Contacts 207A also open the locking circuit to relay 800A which restores, while contacts 206A remove one of the grounds from relay 320A now held energized from contacts 251A on the squelch relay. At the called mobile station, the splash of 3000 cycle tone is without effect due to the fact that the high voltage supply to the tone detector is now open at contacts 344. It is also without effect at the other mobile stations, since they are now tuned to another channel, as will be shown subsequently in a separate section on tuning.

When the called subscriber in the mobile unit 500 replaces the handset 501, following release by the calling fixed subscriber, contacts 503 of the hookswitch open the circuit to the "in use" lamp 515 and the timer clutch 636, while contacts 504 open the circuit to the timer motor 635 and the seizure relay 340. The lamp 515 is thereby extinguished, the clutch 636 disengaged, the motor 635 stopped, and the relay 340 released. Upon release of the clutch 636, the restoring spring 637 returns the shaft 638 and the associated cams 640, 645 and 650 to their normal illustrated position. Relay 340 upon restoring, at its contacts 341, opens the start lead 498 to the transmitter high voltage circuits, at its contacts 342 and 343 disconnects the radio receiver output circuit from the handset receiver and re-connects it to the transformer 303, at its contacts 344, re-connects plate voltage to the tone detector, at its contacts 345 operates relay 330 from ground through contacts 316, 323, and 331, at contacts 346 removes its ground from relay 350, and at contacts 347 starts the tuning motor 600 by way of contacts 354. Responsive to removal of ground from the vibrator start conductor 468, the vibrator stops and relay 460 restores, thereby deenergizing the handset transmitter and the high voltage circuit of the radio transmitter. The latter thereupon removes the mobile station carrier from the air. Re-searching relay 330 upon operating, at its contacts 332 energizes the tuning device coils 660, 675 and 685 over the following circuit: ground, contacts 316, 323, 332, conductor 605, contacts 613, conductor 602, contacts 317, conductor 601, and contacts 621, 622 and 623. Since this station is already tuned to channel #1, this is without effect, and the motor 600 makes one revolution and stops, the contacts 615 thereof releasing relay 350 just after the start of the rotation, and contacts 612 thereof assuring the completion of the rotation.

Squelch relay 250A at the control station restores, in response to removal of the called mobile station's carrier. Squelch relay 250A thereupon, at its contacts 254A opens the inward simplex circuit to the signal-in relay, not shown, in the repeater 49A, which relay then restores, and releases the repeater, and the held link 10, 11 in the automatic exchange. Relay 250A also, at its contacts 855A re-prepares the operate circuit for cut-off relay 800A, at its contacts 251A removes the last ground from the transmitter control relay 320A, and at its contacts 253A re-closes the circuit to supervisory relay 245A. This circuit is opened immediately, however, in the transmitter, due to removal of the high voltage, and is of no consequence at this time.

Transmitter control relay 320A now restores, and at its contacts 321A removes the high voltage from the tone oscillators, not shown, and from radio transmitter 301A. Relay 320A also, at its contacts 822A opens the circuit to relay 830A.

Relay 830A, which is made slow to release by the use of a a copper sleeve, holds its armature for a brief interval however, during which time a circuit is completed to relay 840A from ground through contacts 823A and 833A. Relay 840A accordingly operates, at contacts 841A locks to ground at contacts 852A, at contacts 842A closes a multiple circuit to the slow to operate relays 850A and 860A, and at contacts 843A, 844A and 845A grounds the inward simplex circuits in all three control circuits, thereby seizing all three repeaters 49A, B and C and making them busy. If any of these repeaters are already busy, this action will not affect them as their inward simplex is already grounded from the squelch relay of the associated control circuit.

It should be pointed out at this time that the relay 860A which puts the #2 and #3 carriers on the air momentarily, is made slow to operate by the use of an armature end slug, and is provided with an operate delay interval of some 30 to 50 milliseconds. Relay 850, on the other hand, which cuts off the stated splash of carrier, is provided with an operate time delay of approximately ½ second, by being connected in series with a self-heating resistor 854A made of a negative temperature coefficient resistance material. As the resistor heats, its resistance drops and the current increases steadily until it reaches a value sufficient to operate the relay, the relations being such in this case that the relay operates in approximately 500 milliseconds. Any other form of timing arrangement to give the same delay would be equally satisfactory.

Meanwhile, responsive to the removal from the air of the carrier of the control station transmitter 301A, squelch relay 320 at the called mobile station restores. Relay 320 thereupon, at its contacts 322 opens the high voltage supply circuit to the tone detectors, at its contacts 325 again prepares the call initiation circuit, and at its contacts 323 opens the locking circuit to the signal relay 360 which restores. Relay 360, upon restoring, at its contacts 365 removes its shunt from contacts 325, and at its contacts 369 extinguishes the "incoming call" lamp 514.

Meanwhile at the radio control station, relay 860A operates from contacts 842A, after its brief delay period of some 30 milliseconds, and at its contacts 862A locks to contacts 851A of the timer relay 850A. Relay 860A further, at its contacts 863A and 864A, operates the transmitter control relays 320B and 320C, in the control circuits 300B and 300C. Relays 320B and 320C thereupon connect up the high voltage circuits for the radio transmitters 301B and 301C which promptly put their carriers on the air. Relays 320B and 320C also close the circuit of the associated relays 830B and 830C, not shown, but the latter relays do not operate, as their circuits are closed for only ½ second, instead of the required 5 seconds.

The calling mobile station is not affected by the carriers of the 2nd and 3rd channels put out by the transmitters 301B and 301C, since it is still tuned to the 1st channel. The remaining idle mobile stations which may be standing by on either the 2nd or the 3rd channel, depending on circumstances, are affected and operate their squelch relays 320, and their re-searching relays 330. Relay 330 in said idle mobile stations, thereupon, at its contacts 331, locks to contacts 323, and at its contacts 332 closes a multiple circuit to motor 600 and the tuner magnets 660, 675, 685, as follows: ground, contacts 316, 323, 332, conductor 605, contacts 613, 611, conductor 608, contacts 353, conductor 609, motor 600, and from contacts 613 again over conductor 602, contacts 317, conductor 601 and contacts 621, 622 and 623 to the tuning magnet 660 and the release magnets 675 and 685. The associated radio transmitters and receivers are thereby re-tuned to the 1st channel, and the shaft 629 makes one revolution and stops. Squelch relay 320 at these stations restores immediately, as soon as they are re-tuned to the 1st channel, and unlocks relay 330. Contacts 616 of the tuner open the circuit to relay 340 during the tuning operation to prevent initiation of an inward call while the tuner is off normal.

At the radio control station, relay 850A operates after ½ second and at contacts 851A and 853A opens the locking and operate circuits for relay 860A, and at contacts 852A opens the locking circuit for relay 840A. The latter relay is made slightly slow to release, by the use of a heel-end slug, and holds its armature for a moment, but relay 860A restores quickly, and releases the transmitter control relays 320B and 320C. The latter relays accordingly remove their carriers from the air, shortly after the start of the rotation of the tuning motors at the mobile stations. Relay 840A then restores, releasing relay 850A, and at contacts 843A, 844A and 845A unbusies the repeaters 49 at the automatic exchange. At the mobile stations, the cam 610 at the completion of its rotation, again closes its contacts 616 to re-prepare the circuit to relay 340, and the system is again ready to initiate calls, in either direction.

If the called mobile subscriber hangs up first, on an outward call, the release operation is only slightly different. Upon replacement of the handset on the hookswitch at the called mobile station, the hookswitch contacts 504 and 505 cause the release of relay 340 and the call timer, and the darkening of the lamps 515 and 514 as before. Relay 340 upon restoring, again takes the mobile station's carrier off the air, and operates relay 330. Relay 330 thereupon again locks to the squelch relay, and at contacts 332 energizes the tuner coils 660, 675 and 685 as before, and starts the motor 600. The tuner then makes one revolution as before and stops, leaving the station tuned to the 1st channel. If the calling station does not release at once however, the station will be tuned to a different channel, as will be shown subsequently.

Squelch relay 250A at the control station restores, responsive to removal of the called mobile station's carrier. Relay 250A thereupon at its contacts 251A removes one of the grounds from relay 320A, which remains energized, however, from contacts 206A. Relay 250A also, at contacts 253A closes the circuit of supervisory relay 245A, at contacts 254A opens the inward simplex circuit, and at contacts 855A re-closes the operate circuit to cutoff relay 800A now locked to ground at contacts 207A. Responsive to the removal of ground from the inward simplex at contacts 254A, the signal-in relay, not shown, in the repeater 49A restores, and again reverses the talking battery to the calling line. Supervisory relay 245A operates responsive to the closure of its circuit, and at contacts, not shown, again connects ground and battery to the inward talking circuit, thereby re-operating the dial tone relay, not shown, in the auxiliary circuit 179A to give a disconnect signal to the calling subscriber.

When the calling subscriber T hangs up, the line relay, not shown, in the repeater 49A restores, releasing the repeater, and the link 10, 11 at the automatic exchange. Ground is removed from the signal-out conductor 170A and the outward simplex circuit, thereby causing the release of the line relay 200A at the control station. Relay 200A upon restoring, at contacts 201A opens the circuit to the slow to release hold relay 205A, and at contacts 202A again operates pulsing relay 210A through contacts 208A and 219A. Relay 210A thereupon at contacts 212A again puts the 3000 cycle seizure tone on the carrier of transmitter 301A. This seizure tone is picked up by the radio receiver 302 at the called mobile station, but is without effect at the other mobile stations, which are now, as previously stated, tuned to another channel. At the called mobile station 500, however, where the tone detector is again in operative condition due to the release of relay 340, the 3000 cycle tone is passed from the radio receiver 302 to the detector, and causes the operation of plate relay 370. This relay is now ineffective, however, since there is no ground available at the contacts 371 and 372, due to the now open contacts 333 on the operated re-searching relay 330. If the called station is now tuned to another channel, due to the calling subscriber not hanging up promptly, the 3000 cycle tone will of course be completely ineffective.

Upon the eventual release of hold relay 205A contacts 207A and 208A thereof open the circuits of relays 210A and 800A and both of these relays restore. At the same time contacts 206A on the hold relay remove the last ground from transmitter control relay 320A, which restores. Relay 320A thereupon, at contacts 321A removes the high voltage from the tone oscillator, not shown, and the transmitter 301A as before, at contacts 822A opens the circuit to relay 830A which holds for an instant, and at contacts 823A operates relay 840A. Relay 840A then locks, energizes relays 850A and 860A in parallel, and busies the repeaters 49A, B and C, exactly as previously described.

Meanwhile the transmitter 301A, responsive to disconnection of its plate voltage by relay 320A removes its carrier from the air. At the called mobile station, squelch relay 320 thereupon restores, and at its contacts 323 opens the locking circuit for relays 330 and 360 which also restore. If the calling station failed to disconnect at once, however, the station will be tuned to a new channel, the relays 320, 330 and 360 will all be already normal, and the removal of the carrier of the transmitter 301A will be in itself completely without effect, except as to subsequent tuning operations.

At the radio control station, relay 860A operates as before, shortly after the closure of its circuit at conacts 842A, and puts the #2 and #3 carriers on the air exactly as before, by operating the transmitter control relays 320B and 320C. Approximately ½ second later, relay 850A operates, and deenergizes relays 860A and 840A. Relay 860A restores quickly, and takes the #2 and #3 carriers off the air, and shortly thereafter relay 840A restores and unbusies the repeaters 49A, B and C. The control station is now again at normal, and the idle mobile stations are retuned in response to the aforementioned splash of carrier, as previously described.

It will be understood, of course, that a simple timer could be added to the repeaters 49 to release said repeaters, and the connected switches at the exchange after a certain interval, in order to prevent an exchange subscriber from holding a radio channel busy by failing to hang up after an outward call. Such schemes are well known in automatic telephony, especially for small exchanges, and need not be described here.

MOBILE UNIT CALL TO EXCHANGE SUBSCRIBER

*Seizure of a radio channel*

Let it now be assumed that the mobile subscriber at the mobile station 500 desires to make a call to the fixed substation T in the automatic exchange. To initiate the call, the subscriber at the mobile station merely removes his handset 501 from the hookswitch 503, in the usual way. Responsive to removal of the handset, hookswitch contacts 505 light the "in use" lamp 515, and operate the timer clutch 636 over conductor 529. At the same time, hookswitch contacts 504 close a circuit to the seizure relay 340, through back contacts of the squelch relay, as follows: ground, contacts 504, conductor 526, contacts 325, conductor 624, contacts 646 and 652 on the timer, contacts 616 on the tuner and conductor 618 to relay 340. A branch of this circuit also extends from conductor 624 by way of contacts 651 to the timer motor 635, which starts driving the shaft 639 and its cams to time the call.

Seizure relay 340 operates, after a very brief delay, due to its being made slightly slow to operate, and at contacts 341 passes ground from contacts 316 to the high voltage start conductor 408 as before. Relay 340 also, at its contacts 342 and 343 switches the output circuit of the receiver 302 from the detector circuit to the handset receiver circuit, at its contacts 344 disconnects plate voltage from the detector circuit, at contacts 345 opens the circuit to the re-searching relay 330, at contacts 346 closes a circuit to the tuner start relay 350, at its contacts 348 prepares a dial grounding circuit, at contacts 349 opens a point in the ground feed to the register circuit, at contacts 349′ closes a self holding circuit, and at contacts 349″ disconnects the hum signal on conductor 326 from contacts 367 and conductor 522 leading to the handset receiver.

The tuner start relay 350 operates, from contacts 346, and at contacts 355 locks to contacts 615 of the tuning apparatus over conductor 617. At the same time, the ground on conductor 408 from contacts 341 operates the vibrator 490 and the power relay 460, the latter being made slow to operate, to permit the vibrator to start before being connected to the transformer 498. The transmitter 402, in response to the application of high voltage thereto, places its carrier on the air to seize the control station. For convenience of explanation, it will be again assumed that all channels are free, and that the transmitter 402 and the receiver 302 are tuned to their respective #1 channel frequency. At the control station therefore, this #1 carrier is picked up by the radio receiver 228A in the control circuit 300A, and causes the operation of the squelch relay 250A associated therewith. Squelch relay 250A upon operating, at its contacts 855A opens the operate circuit to the seizure tone relay 810A to prevent its operation, at contacts 254A closes the signal-in circuit, at contacts 253A opens the operate circuit to the supervisory relay 245A to prevent its operation, and at contacts 251A grounds conductor 310A leading to transmitter control relay 320A. Relay 320A operates and applies the high voltage to transmitter 301A, which immediately, in response thereto, places its carrier on the air. Relay 320A also, at its contacts 822A energizes relay 830A, which operates some 5 seconds later, as previously described, in series with the negative temperature coefficient resistor 835A.

The return carrier from transmitter 301A is picked up by the radio receiver 302 at all idle mobile stations, and operates the squelch relays thereat, thereby operating the associated researching relay 330 from ground through contacts corresponding to 316, 323, 381 and 345. These stations are thereby immediately tuned to a new channel, in a manner to be described in detail under a separate heading. In the illustrated calling mobile unit 500 however, relay 330 is prevented from operating by the open contacts 345. At this station, therefore, the squelch relay 320 upon operating, at its contacts 325 opens the original operate circuit for the seizure relay 340, and at its contacts 324 closes a holding circuit for relay 340 which may be traced as follows: ground from the hookswitch on conductor 526, through contacts 349′ and 324, conductor 603, contacts 652 and 616, and conductor 618 to relay 340. It may be seen that this ground shunts contacts 646 which are associated with the out-of-range timer, and renders them ineffective. The operation of this timer will be described under a separate heading. The squelch relay further at its contacts 323′ removes ground from conductor 607 leading to the out-of-range lamp circuit, at contacts 323 grounds the dial shunt springs 513 by way of contacts 333 and 348 and conductor 521, and at contacts 322 connects the high voltage to conductor 409 leading to springs of the transfer relay 450.

Meanwhile, at the control station, the grounding of the inward simplex circuit at contacts 254A of the squelch relay 250 causes the operation of the signal-in relay, not shown, in the repeater 49A, over contacts 282A and 278A, relay 240A, conductors 194A and 195A, auxiliary unit 179, and the signal-in conductor 173A. The repeater 49A is thereby seized and in turn seizes an associated incoming selector 24A over the associated incoming trunk 20A, and marks itself busy at the banks of all local selectors such as 11 having access thereto, in known manner. The incoming selector thereupon connects dial tone in normal manner to the trunk 20A and this tone is passed back to the calling mobile subscriber over the outward side of the now extended speech circuits, including the two-way talking conductors 171A, 172A, the outward talking conductors 190A, 191A, the repeating coil 236A, radio transmitter 301A, radio receiver 302, contacts 343, conductor 522, and the telephone receiver in the handset 501.

*Selecting exchange subscriber*

Upon hearing the dial tone from selector 24A, the calling mobile subscriber operates the telephone dial 510 in normal manner, to dial the digits composing the call number of the fixed subscriber T through the switches of the automatic exchange. As soon as the dial 510 is moved from its normal position, an off-normal cam, not shown, closes the shunt springs 513 which remain closed until the dial has again returned to its normal position. Closure of these contacts causes the operation of transfer relay 450, from the ground at contacts 316, over contacts 323, 333 and 348, conductor 521, shunt springs 513, and conductor 573 to relay 450.

Transfer relay 450 upon operating, at its contacts 452, 453, 454, 456 and 458 opens the circuits whereby the tubes 308 and 309 and their associated networks are normally connected up as a tone detector, and at its contacts 451, 455, 457 and 459 re-connects them to serve as a tone oscillator. More specifically, at its contacts 452 relay 450 disconnects a portion of the resistance network 327 used when the tubes are serving as tone detectors, and at its contacts 451 connects up a different portion of the same network for use with the tube grids and cathodes while serving as oscillators. At its contacts 453 and 454 relay 450 disconnects the tone transformer 303 from the tube grids. At contacts 456 and 455 the plate circuit of tube 309 is disconnected from relay 373 and connected to conductor 422 whereby the 2800 cycle output of the tube 309, while acting as an oscillator, is caused to appear across a portion of the winding of transformer 305, and is thence passed by induction into the other windings. At contacts 458 and 457 the plate circuit of tube 308 is disconnected from relay 370 and connected to conductor 417 whereby the 3000 cycle output of the tube 308, while acting as an oscillator, is caused to appear across a portion of the winding of transformer 304, and is thence passed by induction into the other windings. Also at contacts 459, relay 450 connects the high voltage from contacts 322 and conductor 409 to the resistance network 327.

When the calling mobile subscriber releases the dial to hend the first digit of the call number, it rotates back to its normal position, and the cam 511 during this rotation closes and opens the pulsing contacts 512 a number of times dependent on the value of the digit dialled. Upon each closure of contacts 512 pulsing relay 440 operates, from the ground on conductor 521, through springs 513 and 512 and conductor 574 to relay 440. At each such operation, relay 440 at its contacts 441 closes a circuit to pulsing relay 430, at its contacts 443 removes a short circuit from resistor 434 in the input circuit to the radio transmitter, and at its contacts 442 connects the left winding of the transformer 304 across the same resistor 434. The 3000 cycle output of the oscillator tube 308 is thereby impressed upon the input circuit of the radio transmitter 402 over conductors 415 and 416, contacts 442 and conductor 437, and resistor 434, and is emitted by the transmitter 402 as a modulation of its carrier. Pulsing relay 430 also operates, after a short delay due to being made sluggish by the use of a shunting non-inductive resistor. Relay 430 thereupon at its contacts 432 removes a short circuit from resistor 433 in the transmitter input circuit, and at its contacts 431 connects the left winding of transformer 305 across the same resistor. The 2800 cycle output of the oscillator tube 309 is thereby impressed upon the input circuit of the radio transmitter 402 over conductors 414 and 415, contacts 431 and conductor 435, and resistor 433, and is emitted by the transmitter as a second modulation of the carrier. During each succeeding open period of the pulsing contacts 512 relays 440 and 430 restore, and remove the 3000 and 2800 cycle modulating tones from the carrier. Relay 450 restores when the dial gets back to the normal position.

These impulses of 3000 and 2800 cycle tone are picked up by the radio receiver 228A at the control station, and are passed thereby to a tone detector, not shown, over conductors 233A. The tone detector, in response thereto, operates the inward pulsing relays 275A and 280A once for each time the two tones are received in the proper sequence and in the proper time relationship. Relays 275A and 280A accordingly open and reclose their contacts 278A and 282A in unison with the dial pulses, and repeat the impulses over the signal-in circuit comprising conductors 194A, 195A and 173A to the signal-in relay, not shown, in the repeater 49A. The signal-in relay in turn, repeates the impulses to the incoming selector 24A. The incoming selector 24A operates in response to these impulses to select the group of connectors having access to the wanted subscriber station T, and then hunts automatically to find an idle connector in that group, such as the connector 22. The selector 24A thereupon switches the connection ahead to the seized connector.

The second and third digits are transmitted in like manner, and are passed through the selector 24A to the connector 22, which in response thereto extends the connection to the subscriber line 2. If the called line is busy, the connector 22 will pass back busy tone to the selector 24A and the repeater 49A in the usual manner, and this busy tone will be passed back to the calling mobile subscriber by the radio transmitter 301A in the same manner as the dial tone from the selector 24A, as previously described. Assuming that the called station is idle however, the connector marks this line as busy to the other connectors having access thereto, and connects ringing current to the called line to signal the called subscriber. At the same time, ring-back tone is passed back to the repeater 49A, and is passed back to the calling mobile subscriber by the radio transmitter 301A.

*Exchange subscriber answers*

When the called subscriber T at the automatic exchange answers, the connector 22 switches through to complete the connection and cut off the ringing current in known manner. The connector 22 also reverses its battery loop back to the repeater in accordance with standard automatic telephone practice. Responsive to this reversal, an answer relay, not shown, in the repeater 49A is operated to ground the signal-out conductor 170A. This ground is thereby extended over the outward simplex to line relay 200A at the control station which operates. Relay 200A in turn, operates hold relay 205A which, at its contacts 206A connects an additional ground to the power relay 320A to maintain the transmitter high voltage circuits, not shown. Relay 810A does not operate at this time, due to the open contacts 855A on the squelch relay.

The connection is now completed and a regular two-way conversation may proceed just as for a call between two fixed subscribers. The talking circuit for the mobile subscriber is now from the transmitter of the handset 501, over conductor 572, transformer 435, radio transmitter 402, radio receiver 228A, conductors 233A, the "T" network 238A, repeating coil 237A, conductors 194A and 195A, auxiliary unit 179A, conductors 171A and 172A, repeater 49A, trunk 20A, selector 24A and connector 22 to the telephone receiver not shown, at the called substation T. The talking circuit for the called subscriber is from the telephone transmitter not shown, at the called substation T, through the connector 22, the selector 24A, trunk 20A, repeater 49A, conductors 171A and 172A, auxiliary unit 179A, conductors 190A and 191A, repeating coil 236A, filter 285A, radio transmitter 301A, radio receiver 302, contacts 343, and conductor 522 to the receiver of the handset 501. Talking battery for the called station is furnished from the connector 22, while talking battery for the mobile subscriber is from battery through power relay 460 through contacts 463, choke coil 465, transformer 435, conductor 572 and the handset transmitter, to ground on conductor 528. The speech circuit for the handset transmitter is over the same circuit, but excluding the choke 465 and the relay 460, and including the condenser 466 in their place.

*Normal release*

If the calling mobile subscriber hangs up first, on such a call, the connection will be released at once. The replacement of the handset 501 at the calling mobile station opens the contacts 504 and 505 of the hookswitch, in the usual manner. Contacts 504 thereupon extinguish the "in use" lamp 515, and release the timer clutch 636, while contacts 505 open the circuits of the timer motor 635 and the seizure relay 340. Upon release of the clutch 636, the timer shaft 639 and its associated cams are restored to the illustrated normal position, by spring 637. Relay 340 also restores and at its contacts 341 opens the start circuit to the high voltage vibrator 490. Relay 340 also, at contacts 342 and 343 re-connects the radio receiver output circuit to transformer 303, at contacts 344 re-connects plate voltage to the detector circuit, at contacts 345 closes a circuit to researching relay 330 from ground through contacts 316, 323, 361 and 345, at contacts 346 removes its ground from the locked up timer start relay 350, at contacts 347 closes a circuit to motor 600 through contacts 354, and at contacts 349′ opens another point in its own operate circuit, now open at contacts 325.

Re-searching relay 330 operates, and at its contacts 331 locks to ground at contacts 323. Relay 330 also, at its contacts 332 connects ground from contacts 323 to conductor 605, and thence by way of contacts 613, conductor 602, and contacts 317 to the tuning lead 601, thereby re-energizing the coils 660, 675 and 685 of the tuning device. This is without effect, and the armatures 661, 671 and 681 remain in the positions shown. The motor 600 also starts, responsive to the closure of its circuit and drives the tuning cams one revolution. Cam 610 operates its springs shortly thereafter, whereupon springs 614 connect ground from contacts 323 to the tuning conductors 601 and 602, springs 615 open the locking circuit to relay 350 which restores, and springs 612 prepare an alternative circuit to motor 600 over contacts 353, which is completed as soon as relay 350 restores, to assure the completion of the rotation.

Meanwhile, responsive to the removal of ground from conductor 403 by contacts 341 of the seizure relay, power relay 460 restores, and the high voltage vibrator of Figure 4 stops operating. Relay 460 thereupon de-energizes the handset transmitter and the high voltage circuits to the radio transmitter 402, which responds quickly and removes the #1 mobile carrier from the air.

Responsive to the removal of this carrier, squelch relay 250A at the control station restores. Relay 250A thereupon, at its contacts 253A recloses the circuit to supervisory relay 245A briefly, at contacts 251A removes its ground from transmitter control relay 320A which remains operated, at contacts 254A opens the inward simplex circuit to the repeater 49A, and at contacts 855A re-closes the circuit to the seizure tone relays 800A and 810A, from the ground at contacts 207A.

Relay 810A operates immediately and at its contacts 812A places the 3000 cycle tone on the carrier of transmitter 301A. At the mobile station 500, this causes operation of plate relay 370 but this is without effect, as the ground circuit to its contacts 371 and 372 is now open at contacts 333 of the now operated re-searching relay 330. At the other mobile stations, the seizure tone, being on the #1 outgoing channel, is entirely without effect, as these stations are now tuned to a different channel. Relay 800A also operates from contacts 855A after a delay of some 100 milliseconds due to its being made slow to operate, locks direct to contacts 207A, and releases relay 810A to remove the seizure tone from the carrier.

The signal-in relay, not shown, in the repeater 49A restores, upon the opening of its circuit at contacts 254A of the squelch relay 250A, and releases the repeater and the held switches 24A and 22 in the automatic exchange. The repeater 49A thereupon removes ground from the signal-out conductor 170A, shortly after the release of the squelch relay. Line relay 200A at the control station accordingly restores, and at contacts 201A opens the circuit of the hold relay 205A. Relay 205A being made slow to release remains operated for a brief interval, however. During this interval pulsing relay 210A operates over contacts 202A, 208A and 219A. Relay 210A upon operating, at its contacts 212A again puts the 3000 cycle seizure tone on the carrier, with the same effects stated in the previous paragraph. Relay 205A then restores and releases relay 210A and the seizure tone relays 800A or 810A, whichever is operated at this time. Relay 205A also at its contacts 206A removes the final ground from relay 320A.

The transmitter control relay 320A now restores, and at its contacts 321A removes the high voltage from transmitter 301A. Relay 320A also at contacts 822A opens the circuit to relay 830A, which being slow to release remains operated for an instant. During this time a circuit is closed briefly through contacts 823A and 833A to relay 840A which operates. Relay 840A therefore, at contacts 841A locks to the timing relay 850A, at contacts 842A energizes the timing relay 850A and the slow to operate relay 860A in parallel, and at contacts 843A, 844A and 845A grounds all of the inward-simplex circuits, thereby seizing the repeaters 49A, B and C as for an inward call, and making them busy to all selectors in the automatic exchange having access thereto.

Responsive to the removal from the air of the carrier of the control station transmitter 301A, squelch relay 320 at the calling mobile station restores. Relay 320 thereupon, at its contacts 322 removes the high voltage from the tone detector circuits, and at its contacts 323 removes tuning ground from conductors 605, 604, 602 and 601, and at the same time opens the operate and locking circuits to the re-searching relay 330, which restores. At this time the shaft 629 of the tuner will have made less than ¼ revolution, and since the cams 625 and 630 do not close their contacts until after ⅓ and ⅔ revolutions, respectively, the original tuning remains effective. On the completion of the rotation therefore, the motor 600 will stop, due to the opening of contacts 612, contacts 616 will again prepare the circuit to relay 340, and the station will be again in the standby condition, ready to make or receive calls on the 1st channel.

Meanwhile, at the control station, relay 860A operates from contacts 842A after a delay of some 30 to 50 milliseconds, due to its armature end slug, at contacts 862A locks to contacts 851A on the timer relay 850A, and at contacts 863A and 864A operates the transmitter control relays 320B and 320C to put the #2 and #3 fixed carriers on the air, from radio transmitters 310B and 301C. Relays 320B and 320C also complete a circuit to the associated relays 830B and 830C, not shown, but these relays do not operate, as their circuits do not remain closed for the required 5 seconds.

The calling mobile station is not affected by the fixed carriers #2 and #3 now emitted by the radio transmitters 301B and 301C since it is still tuned to the 1st channel. The remaining idle mobile stations however, which will be standing by on one of the other channels, will operate their squelch relays 320 and their re-searching relays 330. The relays 330 thereupon lock and at their contacts 332 operate the motor 600 from ground, contacts 316, 323, 332, conductor 605, contacts 613, 611, conductor 608, contacts 353 and conductor 609 to motor 600. A branch of this circuit also extends from contacts 613 over conductor 602, contacts 317, conductor 601, and contacts 621, 622 and 623 to the tuning magnet 660 and the tuning release magnets 675 and 685. The radio transmitters and receivers at these stations are thereby re-tuned to the 1st channel, and the shaft 629 makes one revolution and stops, in the manner previously described. The squelch relays 320 at these stations restore immediately, as soon as they are re-tuned to the 1st channel, and release the re-searching relay 330.

At the radio control station, the timing relay 850A operates, after ½ second, and at contacts 851A and 853A opens the locking and operate circuits for relay 860A, and at contacts 852A opens the locking circuit for relay 840A. Relay 840A being made slightly slow to release holds its armature briefly, but relay 860 restores at once, and releases relays 320B and 320C. The latter relays then open the high voltage circuits and the transmitters 301B and 301C remove their carriers from the air. Relay 840A restores shortly thereafter, and at its contacts 842A releases relay 850A. Relay 840A also at contacts 843A, 844A and 845A opens the inward simplex circuits to free the repeaters 49A, 49B and 49C. The system is thereupon again at normal, and ready to initiate calls in either direction.

Should the called subscriber at the fixed substation T at the exchange end hang up first, on such a call, the connector 22, responsive to interruption of the called line loop will again reverse the polarity of the trunk 20A in known manner. This causes the repeater 49A to partly release, and to remove ground from the repeater end of the signal-out conductor 170A. This causes the release of the line relay 200A at the control station. Relay 200A upon restoring at its contacts 201A opens the circuit to hold relay 205A which holds its armature briefly, as before. During this interval pulsing relay 210A operates from contacts 202A, 208A and 219A, and at its contacts 212A puts the 3000 cycle seizure tone on the carrier briefly. At the calling mobile station this is without effect, as the tone detector thereat is now disabled, at contacts 344 on the operated seizure relay 340. It is also without effect at the other mobile stations, as their radio receivers are now tuned to a different channel. Hold relay 205A restores shortly thereafter and releases relay 210A. Relay 205A also, at its contacts 206A removes its ground from relay 320A, which remains operated, however, from ground at contacts 251A of the still operated squelch relay 250A.

When now, the calling mobile subscriber hangs up, seizure relay 340 restores as before, and at contacts 341 again opens the circuit for power relay 460 and the high voltage vibrator. Relay 340 also at contacts 345 operates the re-searching relay 330 over contacts 316, 323, 381, and 345, and at contacts 347 closes a circuit to motor 600, via contacts 354 and conductor 609. Relay 330 operates, locks as before to contacts 323, and at contacts 332 connects ground from contacts 323 by way of conductor 605, contacts 613, conductor 602, contacts 317, conductor 601, and contacts 621, 622, 623 to the magnets 660, 675 and 685 of the tuning device. This is without effect, however, as the armatures 661, 671 and 681 are already in the desired position and the calling mobile station remains tuned to the 1st channel. The motor 600 then drives the tuning cams one revolution and stops, releasing relay 350 as before at the start of the rotation.

Meanwhile, power relay 460 has released, upon the opening of its circuit at contacts 341 of the seizure relay 340, and has removed plate voltage from the transmitter 402, which thereupon removes its carrier from the air. Squelch relay 250A at the control station thereupon restores, and at contacts 254A removes ground from the inward simplex. This completely releases the repeater 49A and the switches 24A and 22 at the automatic exchange. Relay 250A also, at its contacts 251A removes the last ground from relay 320A which restores. Relay 320A thereupon at contacts 321A removes the high voltage from transmitter 301A to take its carrier off the air, at contacts 822A opens the circuit to the slow release relay 830A and at contacts 823A operates relay 840A. Relay 840A then locks, energizes timing relays 850A and 860A, and busies the repeaters 49A, 49B and 49C, exactly as before. Relay 860A then operates to put the #2 and #3 carriers on the air, and shortly thereafter, relay 850A operates. Relay 860A then restores, to remove the carriers #2 and #3, and relay 840A restores shortly thereafter to release the repeaters. The calling mobile station is unaffected by these carriers, but the other mobile stations respond to one or the other and are thereby re-tuned as necessary.

MOBILE STATION TUNING

*General*

The automatic tuner provided at each mobile station, consists essentially, as previously indicated, of a 3-channel tuning device 690, controlled from three tuning cams 620, 625 and 630 arranged to be driven one revolution by an associated motor 600, each time re-tuning is required. A 4th cam 610 is also provided for miscellaneous control functions. The motor is arranged to drive the shaft 629 in a clockwise direction at a speed to provide a complete rotation of the cams in 2 seconds. The motor control cam 610 operates its contacts almost immediately after the start of the rotation, and restores them to the position shown only at the conclusion of the rotation. The channel #1 cam 620 opens its contacts shortly after the start of the rotation, and recloses them shortly before the conclusion of the rotation. The channel #2 cam 625 closes its contacts briefly after ⅓ of a revolution, or after an elapsed rotation time of some 666 milliseconds. The channel #3 cam 630 closes its contacts briefly after ⅔ of a revolution or after an elapsed rotation time of some 1333 milliseconds. If ground is found on the tuning conductor 601 at the time any of the tuning cams have their contacts closed, the mobile station's radio receiver and transmitter will be tuned to the corresponding channel.

The tuning device 690 consists basically in 3 pairs of electromagnets, one pair for each channel, for controlling the tuning armatures 661, 671 and 681. These armatures, which are arranged to remain in their last operated position when the coils are deenergized, control separate tuning networks, in the radio receiver 302 and the radio transmitter 402, in the general manner indicated at the lower right in Figure 6 of the drawings. Since such arrangements are well known, they will not be described further, except to say that when any armature is pulled up to the left by its associated tuning relay or electromagnet such as 660, 670 or 680, it closes an associated set of contacts such as the set including contacts 662 and 663, to tune the transmitter and receiver to the corresponding channel, while when such armature is pulled up to the right by the associated tuning release coil such as 665, 675 or 685, the associated contact set is opened, to disconnect the corresponding portion of the tuning network.

Also, the circuit arrangements are such that when any tuning coil is energized, from the corresponding tuning cam, the tuning release coils for the other two channels are energized at the same time. Thus when the tuning cams are in the normal position, as shown in the drawing, a ground placed on conductor 601 will pass through the closed contacts of cam 620, and tune the mobile station receiver and transmitter to the #1 channel, if they are not already on this channel, by energizing the tuning coil 660 and the release coils 675 and 685 simultaneously. Under these conditions, the left set of tuning contacts including contacts 662 and 663 will be closed, and the other contact sets will be open. Similarly, a ground on conductor 601 when cam 625 has its contacts closed, will tune the station to the #2 channel by energizing the tuning coil 670 and the release coils 665 and 685 in obvious manner, thereby closing the middle contact set including the contacts 672 and 673 and opening the other contact sets. Likewise, a ground on conductor 601 at a time when cam 630 has its contacts closed, will tune the station to the #3 channel by energizing the tuning coil 680 to close the right-hand contact set including the contacts 682 and 683 and by energizing the release coils 665 and 675 to open the other contact sets.

*Power-on tuning*

When a mobile unit is taken out of service, the power is normally tuned off, to save needless drain on the battery. Accordingly, when the mobile unit is next put in service, it must be tuned in to the current standby channel, which may or may not be that to which the set was last tuned before the power was turned off. This re-tuning is done automatically, without attention from the operator, in the following manner.

When the power is turned off, the radio receiver 302 is deenergized, and the power-on relay 315 restores, opening its contacts 316 and 317, and closing contacts 318. When the power is turned on again relay 315, which is connected in the plate circuit of one of the receiver tubes, as previously indicated, is re-operated. Since, however, these tubes are of the heater type, there will be a delay of perhaps several seconds from the time the equipment is turned on till relay 315 operates. During this time ground passes over conductor 601 from contacts 318, and energizes the tuning coil 660 and the release coils 675 and 685 through contacts 621, 622 and 623. If the equipment was last tuned to channel #2 or #3, the armature 661 will be pulled up to the left to tune the station to channel #1, and the armatures 671 and 681 will be pulled up to the right, to release the previous tuning. If the equipment was already tuned to channel #1 it will remain so, and the ground from contacts 318 has no apparent effect. And as soon as the receiver tubes are hot relay 315 will operate and disconnect the ground from conductor 601. If channel #1 is idle at this time, the equipment will remain tuned to this channel.

If channel #1 is in use, however, the squelch relay 320 will operate, as soon as the radio receiver becomes operative, and will operate re-searching relay 330. Relay 330 thereupon locks to the squelch relay and at contacts 332 regrounds the tuning conductor 601 from ground at contacts 316 by way of contacts 323, 332, 613 and 317. A branch of this circuit also energizes the motor 600 by way of contacts 613, 611 and 353. The motor 600 starts, drives the shaft 629 one revolution in 2 seconds, and stops. Shortly after the start of the revolution, cam 610 operates its contacts, whereupon contacts 611 and 613 open the original motor and tuning lead circuits. and contacts 612 and 614 close alternative circuits thereto, contacts 614 picking up ground from contacts 323 of the squelch relay. Shortly thereafter cam 620 releases its contacts, and after some 666 milliseconds cam 625 closes its contacts, thereby energizing the coils 670, 665 and 685 as follows: ground, contacts 316, 323, conductor 604, contacts 614, conductor 602, contacts 317, conductor 601, and contacts 626, 627 and 628. Armature 671 is thereby pulled up to the left to tune the station to channel #2, while armatures 661 and 681 are pulled up to the right to release the previous tuning.

If the second channel is free, squelch relay 320 will immediately restore, when the receiver 302 is thus tuned to this channel. thereby removing its ground from conductors 604 and 601. When therefore cam 630 closes its contacts, after some 1333 milliseconds, the tuning device 690 is not affected, due to the absence of ground from conductor 601, and the equipment remains tuned to the 2nd channel.

If channel #2 is also busy however, squelch relay 320 will remain operated when the radio receiver is tuned to this channel, and maintains the ground from contacts 323 on the conductors 604, 602 and 601. Now, therefore, when the cam 630 closes its contacts, it energizes the coils 680, 665 and 675 from the grounded conductor 601 in obvious manner. Armature 681 is thereby pulled up to the left to tune the station to channel #3, while armatures 661 and 671 are pulled up to the right, to release the prior tuning.

If the 3rd channel is free, squelch relay 320 will restore as before, as soon as the receiver 302 is tuned to this channel, thereby removing its ground from conductors 604, 602 and 601. When, therefore, cam 620 recloses its contacts, at the conclusion of the rotation, the tuning device 690 is not affected, and the equipment remains tuned to the 3rd channel, until a lower number channel subsequently becomes free.

*Re-tuning unwanted stations on outward calls*

On all calls initiated at the automatic exchange the outgoing selector will seize the first idle repeater 49, which in turn will cause the control station to put the carrier of the corresponding lowest numbered free channel on the air, modulated as previously explained, with a momentary splash of 3000 cycle tone. This carrier, to which all idle mobile stations are tuned, causes the squelch relay 320 to operate at each of these stations, while the 3000 cycle tone causes a momentary operation of plate relay 370, as previously described. Relay 370 then operates relay 380 from ground, contacts 316, 323, 333 and 372. Relay 380 then locks to contacts 349 and 333, at the contacts 381 disconnects the re-searching relay 330 before the latter can operate, it being made slower to operate than relay 380. All idle mobile stations accordingly remain on the channel over which they were seized.

The calling fixed station then dials the call number of the wanted mobile station, to step the selector switches 394 at each of the seized mobile stations. At the called station, the signal relay 360 operates at the end of the 3rd digit to signal the called subscriber, and locks to the squelch relay. When the called subscriber answers, relay 340 operates to complete the connection, further opens the circuit to relay 330, at contacts 346 operates motor start relay 350, and at its contacts 349 releases the locked up hold relay 380, exactly as already described.

At the other mobile stations, the first digit received thereat which does not agree with the call number of that station will operate the kick-off relay 386 in obvious manner through the multipled bank contacts of the 1st, 2nd or 3rd level, as the case may be. Relay 386 upon operating, at its contacts 387 locks direct to the squelch relay, at contacts 389 opens the short circuit to the upper winding of relay 330 to make this relay quick to operate, and at contacts 388 closes a circuit to relay 330 as follows: ground, contacts 316, 322, 388, 345, and relay 330. Relay 330 thereupon operates, at contacts 331 locks in turn to the squelch relay, at contacts 333 unlocks and releases hold relay 380, and at contacts 322 extends squelch relay ground to conductor 606 as before, and thence by way of contacts 613 to the timing conductor 601 and by way of contacts 613 and 611 to the tuner motor 600. The ground on conductor 601 now energizes the coils 660, 675 and 685 as before, and the motor 600 starts its rotation.

If the call was made over the #1 channel to which the station was of necessity already tuned, the energization of coil 660 will be without effect, and the station will remain tuned to this channel. Squelch relay 320 will therefore remain operated to maintain ground on conductor 601 by way of conductor 604 when cam springs 613 open and 614 close immediately after the start of the rotation. Cam 620 then opens its contacts to de-energize coils 660, 675, and 685, and when cam 625 closes its contacts at the ⅓ rotation mark, the ground on conductor 601 passes through contacts 626, 627 and 628 and energizes coils 670, 665 and 685 to tune the station to the #2 channel. If this channel is free, the squelch relay restores at once, removes tuning ground from both conductors 604 and 601, and unlocks and releases relay 330, and the station remains tuned to the #2 channel. If the #2 channel is busy, however, the squelch relay will remain operated, and when cam 630 closes its contacts, the station will be tuned to the 3rd channel, and if this channel is free the squelch relay will then restore to unground the tuning conductor and release relay 330 as before, and the station will remain tuned to this channel.

If the call was made over the #2 channel, which would indicate that the 1st channel was busy, the operation of the relays 336 and 330 at the idle mobile stations, would again ground conductor 601, and start the motor 600. The ground on conductor 601 would immediately pass through the closed contacts 621, 622 and 623 and energize the coils 660, 675 and 685 as before, whereupon the armature 661 would be pulled up to the left to tune the station again to the 1st channel, and the armature 671 would be pulled up to the right to open the 2nd channel tuning circuits. Armature 681, being already up to the right, would not be affected. The 1st channel being also busy, however, the squelch relay will remain operated as before to maintain ground on the tuning conductor, so that when cam 625 again closes its contacts the station will again be tuned to the 2nd channel. This channel being now also busy, the squelch relay still remains operated, and continues to maintain ground on the tuning conductor. When, therefore, cam 630 closes its contacts, the station will be tuned to the 3rd channel, and if this channel is free, the squelch relay will restore and release relay 330, and the station will remain tuned to this channel.

If the call was made over the #3 channel, which would indicate that the 1st and 2nd channels were busy, the operation of the relays 336 and 330 at the idle mobile stations would likewise ground conductor 601, and start motor 600. The ground on conductor 601 would again pass through the closed contacts 621, 622 and 623 and energize the coils 660, 675 and 685, whereupon the armature 661 would be pulled up to the left to tune the station again to the 1st channel, while the armature 681 would be pulled up to the right to open the 3rd channel tuning circuit. Armature 671, being already up to the right, would not be affected. All channels being now busy, the squelch relay will remain operated during the entire rotation of the shaft 629 and the motor 600 will continue to operate until a channel is made free. When therefore the station is next tuned to the freed channel the squelch relay will restore and leave the station tuned to that channel, atl east until some lower numbered channel is freed. The circuit to the seizure relay 340 is held open at contacts 616 as long as the tuner is off normal, in order to prevent the initiation of a call by the mobile subscriber while the tuner is hunting. Contacts 616 do close each time the tuner reaches the home position, but if the motor 600 does not stop at this point, but continues to operate, contacts 616 will be closed only briefly, and since relay 340 is made somewhat slow to operate, it will remain at normal, even though the handset should be off the hookswitch for some time. If the handset receiver is placed to the ear, also, a tone signal, passing from conductor 326 to the receiver over contacts 349″, and 367, and conductor 522, will be heard as an indication that the channels are busy.

*Re-tuning on release of outward calls*

If the calling exchange subscriber hangs up first, the control station puts out a splash of 3000 cycle modulating tone, as previously described, which is without effect, at either the idle mobile stations, now tuned to another channel, or at the called mobile station, whose tone detector plate circuit is now open at contacts 344 of the operated seizure relay 340. When the called mobile station hangs up however, relay 340 restores, at contacts 345 recloses the circuit to the re-searching relay 330, at contacts 346 opens the operate circuit to the locked up relay 350, at contacts 347 closes a circuit through contacts 354 to the tuner motor 600, and at contacts 341 releases relay 400 to take the mobile station's carrier off the air.

Relay 330 operates and locks to the squelch relay, and at contacts 332 grounds the tuning conductor 601 as before by way of contacts 613 and 317, and energizes the tuning device coils 660, 675 and 685. The motor 600 also starts, and shortly thereafter the cam 610 operates its contacts. Contacts 615 then release relay 350, contacts 612 close a secondary circuit to the motor 600, and contacts 614 close a secondary circuit to conductor 601. If the call was originally made over the 1st channel, the station remains tuned to this channel, and squelch relay 320 remains operated from the moment. If, however, the call was made over the 2nd or 3rd channel, the ground on conductor 601 causes the station to be re-tuned to the 1st channel, by the operation of the coils 660 and 675 or 685. The squelch relay, if the 1st channel is free, will then restore at once, and release relay 300.

The control station, responsive to removal of the mobile station's carrier, releases its involved squelch relay 250A, B or C, which in turn releases the associated power relay 320A, B or C, to remove the carrier over which the call was made from the air. Removal of this carrier releases the squelch and signal relays at the called mobile station, unless they have been already released by a change in tuning, as stated in the preceding paragraph. At the idle mobile stations the removal of this carrier is without effect, as they are now tuned to another channel.

Some 30 to 50 milliseconds after the removal of the fixed carrier the control station puts the #2 and #3 carriers on the air, for a period of about 250 milliseconds, in the manner already described. At the called mobile station this is without effect, since this station is now tuned to channel #1, at least temporarily. At the idle mobile stations, assuming them to be now tuned to either the 2nd or 3rd channel, one or the other of these carriers will operate the squelch relay 320 thereat. The squelch relays will then operate the associated re-searching relays 330, thereby re-tuning them to the 1st channel and starting the motors 600. If the 1st channel is now free, the squelch relays will restore again immediately and release relays 330. The tuner will continue to make a full revolution and will return in 2 seconds to the illustrated normal position, without further action. The #2 and #3 carriers are removed before the cam 630 closes its contacts, so that if the 1st channel is busy the station will be tuned to the next lowest idle channel in the manner already described.

If the called mobile subscriber hangs up first, on such a call, relay 340 restores at once and again, at contacts 345 operates relay 330, at contacts 346 removes its ground from relay 350, at contacts 347 starts the motor 600, and at contacts 341, releases relay 400 to take the mobile station's carrier from the air. Relay 330, upon operating locks to relay 320, and at contacts 332 grounds conductors 606, 602 and 601 as before. If the call was originally made over the 2nd or 3rd channel, the ground on conductor 601 causes the station to be re-tuned immediately to the 1st channel, and if this channel is free, the squelch relay 320 will restore and release relay 360. If the call was originally established over the 1st channel, however, the grounding of conductor 601 is without immediate effect and the station remains tuned to the 1st channel, and the squelch relay 320 and the re-searching relay 330 remain operated. When, therefore, the tuner cam 625 closes its contacts, the station will be tuned to the 2nd channel, and if this channel is free the squelch relay and the relays 330 and 360 will restore.

When the calling exchange subscriber then hangs up, the fixed station puts out a splash of 3000 cycle tone, just before removing the old carrier from the air, in the manner previously explained. This tone is without effect, however, as all mobile stations are now tuned to another carrier channel. The old carrier is then removed from the air almost immediately, and shortly thereafter the #2 and #3 carriers come on the air briefly and re-tune all idle stations as required, including the now idle called station.

*Re-tuning idle stations on inward calls*

On all calls initiated at a mobile station the seizure relay 340 thereof operates immediately responsive to removal of the handset, as previously explained, and causes the mobile station's carrier of the free channel to which it is tuned at the time, to be put on the air. The corresponding squelch relay 250A, B or C at the fixed exchange is accordingly operated, from its associated radio receiver, opens the circuit of the associated seizure tone relay 810A, B or C, and operates the associated power relay 320A, B or C. The associated radio transmitter 301A, B or C then puts its carrier on the air without modulation.

The unmodulated return carrier now operates the squelch relays 320 both at the calling mobile station and at the idle mobile stations, which are of course, still standing by on this channel. At the calling station, the operation of the squelch relay shunts out the out-of-range timer contacts and prepares the pulsing circuits in the manner already explained, but is without effect on the tuning circuits, since the circuit to the re-searching relay 330 is open at that station at contacts 345 on the operated seizure relay 340. At the idle stations standing by on this channel, however, the operation of the squelch relay thereat causes the immediate operation of the relay 330 over contacts 323, 381 and 345. Relay 330 thereupon grounds conductor 601 and starts the motor 600. The tuner then tests all three channels, starting with the first, and will re-tune the station to the lowest numbered channel now free, in the manner already explained.

*Re-tuning on release of inward calls*

If the called exchange subscriber hangs up first on such call, the held repeater 49 partly releases, as previously explained, and releases the corresponding line relay 200A, B or C, at the control station. The associated control circuit then puts out a short splash of 3000 cycle tone on the carrier of the associated transmitter 301A, B or C. This is without effect at the calling mobile station, since the detector plate circuit thereat is open at contacts 344 of the seizure relay. This is also without effect at the idle mobile stations, as they are now tuned to another channel.

When the calling mobile subscriber eventually hangs up, relay 340 restores, at contacts 345 recloses the circuit to re-search relay 330, at contacts 346 removes its ground from the locked up relay 350, at contacts 347 starts the motor 600, and at contacts 341 releases relay 460 to take the mobile station's carrier off the air. Relay 330 operates and locks to the squelch relay, and at contacts 332 again grounds conductor 601 by way of contacts 613 and 317, to energize the tuner coils 660, 675 and 685 as before. If the call was originally made over the 1st channel, the station remains tuned to this channel, and the squelch relay 320 remains operated for the moment. If, however, the call was made over the 2nd or 3rd channel the ground on conductor 601 causes the station to be re-tuned to the 1st channel, by the operation of the coins 660, and 675 or 685, as the case may be. If this channel is free, the squelch relay 320 will then immediately release. If not, the station will be again re-tuned as the tuner completes its rotation.

The control station, responsive to removal of the mobile station's carrier, releases the involved squelch relay 250A, B or C, which in turn releases the associated power relay 320A, B or C to remove the corresponding fixed station carrier from the air. Removal of this carrier releases the squelch and re-searching relays 320 and 330 at the calling mobile station, unless these have already been released by a change in tuning. At the other mobile stations removal of this carrier is without effect as they are all tuned to another channel at this time.

Some 30 to 50 milliseconds after the removal of the fixed carrier, the control station puts the #2 and #3 carriers on the air again as before, for a brief interval. At the calling mobile station this is without effect, as this station's receiver is now tuned to the #1 channel. At the other idle mobile stations, if they should be standing by on channel #1 at this time, the #2 and #3 carriers would likewise be without effect, and their tuners would not be operated. If these stations are standing by on the 2nd or 3rd channel, however, one of the carriers will cause the operation of their squelch relays 320, and their re-searching relays 330, thereby re-tuning them to the 1st channel and starting their motor 600. If the 1st channel is now free, the squelch relay 320 will release again at once, and release the re-searching relays 330. The tuner will then complete its operation without further action. If the 1st channel is busy, however, the squelch relays will remain operated, and when turner cam 625 closes its contacts the station will be tuned to the 2nd channel. The #2 and #3 carriers are removed before the cam 630 closes its contacts, so that if the 2nd channel is not in use at this time, the stations will remain tuned to the 2nd channel.

If the calling mobile subscriber hangs up first on an inward call, the seizure relay 340 restores as before, re-closes the circuit to relay 330, removes its ground from the locked up relay 350, starts the motor 600, and releases relay 460 to take the mobile station carrier off the air. Relay 330 then operates and locks, and at contacts 332 grounds conductor 601 over contacts 613 and 317 to re-energize the tuner coils 660, 675 and 685. If the call was originally made over the 1st channel the station remains tuned to this channel, and squelch relay 320 remains operated. If, however, the call was over the 2nd or 3rd channel, the station is re-tuned to the 1st channel, whether it is busy or idle. If the 1st channel is free, the squelch relay 320 will then immediately release. Otherwise the squelch relay will hold, and the station will be re-tuned as necessary as the tuner completes its operating cycle.

The control station, responsive to removal of the mobile station's carrier, releases the involved squelch relay 250A, B or C. This has no immediate effect on the associated power relay 320A, B or C, but it does reclose the circuit to the associated seizure tone relay 810, which operates to put the 3000 cycle ceizure tone on the air for an instant. At the calling mobile station, if the call was over channel #1, the 3000 cycle tone will operate relay 370 from the tone detector, but this will be without effect, as the ground circuit to the contacts 371 and 372 of this relay is now open at contacts 333 of the re-searching relay. If the call was over channel #2 or #3 the calling mobile station is again not affected, as it is now re-tuned to the 1st channel. At the other mobile stations the tone is likewise ineffective, as they are of necessity tuned to another channel.

The involved squelch relay 250 at the control station also at its contacts 254 removes its ground from the inward simplex and releases the associated repeater and the held incoming selector and connector at the automatic exchange as previously described. This in turn removes ground from the outward simplex and releases the associated line relay 200 at the control station. The line relay 200 then operates the associated relay 210 to put another splash of 3000 cycle tone on the carrier which is again without effect. The associated relay 205 restores shortly thereafter and disconnects the tone, and releases the associated power relay 320A, B or C to remove the carrier of the associated transmitter 301A, B or C from the air. Removal of this carrier releases the squelch and re-searching relays 320 and 330 at the calling mobile station, unless these have already been released by a change of tuning, as previously mentioned. The other mobile stations are not affected, as they are now tuned to another channel.

Shortly after the removal of the fixed carrier, the control station puts the #2 and #3 carriers on the air as before, for an instant. At the calling mobile station this is likewise without effect, as this station is now tuned to the 1st channel as stated. If the other mobile stations should be standing by at this time on the 1st channel, these carriers would again obviously be without effect. If, however, the other mobile stations are standing by at this time on the 2nd and 3rd channel one of the carriers will cause their squelch and researching relays 320 and 330 to be operated, thereby re-tuning them to channel #1 and starting their tuning motors 600. The tuners will then complete their tuning cycle, and re-tune these stations to a new channel or leave them tuned to the 1st channel, as required.

OUT-OF-RANGE AND CALL TIMING

The mobile station out-of-range and call timers are both incorporated, in this system, in a common motor-timer driven by the motor 635. The motor 635, as previously indicated, is started from the hookswitch 503 each time the handset 501 is removed therefrom to initiate or to answer a call. The call timing is effective on all calls, but the out-of-range timing is effective only on calls originating at the mobile station, and is arranged to take the mobile station off the air following the initiation of a call thereat, in case the return carrier from the radio control station is not received back within a given time such as, for instance, 2 seconds. Such a situation may arise at times, in case the mobile station has passed beyond the range of the control station's carrier, or finds itself in a blind spot, or with a defective radio receiver, or for any reason resulting in failure of the squelch relay 320 to operate promptly.

As previously described, removal of the handset 501 from the hookswitch 503 to initiate a call, causes operation of the seizure relay 340 over conductor 526, contacts 325, conductor 624, contacts 646, 652, 616 and conductor 618. The motor 635 is also energized from the same circuit over contacts 646, 652, 651, while the timer clutch 636 is operated direct from the hookswitch, over conductor 529. The timer then starts at once to drive the shaft 639 and the cams 640, 645 and 650 in a clockwise direction at a speed corresponding to one revolution of the shaft in say 5 minutes. The seizure relay 340, at contacts 346 operates relay 350, and at contacts 341 grounds conductor 408 to operate relay 460 and the vibrator 490, in the manner previously explained. The latter now connect the high voltage to transmitter 402, which immediately puts the carrier of the current standby channel on the air.

If the return carrier is received promptly from the control station squelch relay 320 operates and the call proceeds in normal manner, with contacts 324 shunting the out-of-range contacts 646 to render them ineffective, and contacts 323′ opening the circuit to contacts 647 to render them also ineffective. The timer therefore continues to drive its cams, to time the call.

If, however, the squelch relay 320 fails to operate within the given time limit, for any reason, the opening of contacts 646 by the out-of-range cam 645 some two seconds after the start of the motor 635, will open the previously traced circuits for relay 340 and motor 635, while the closing of contacts 647 will complete a circuit to lamp 517 as follows: ground, contacts 316, 323′, conductor 607, contacts 647, conductor 527, and lamp 517 to negative battery. The out-of-range lamp 517 accordingly lights, the motor 635 stops, and relay 340 restores. The clutch 636 remains operated, however, to hold the timing cams in place.

When the seizure relay 340 restores, contacts 341 remove ground from conductor 408, thereby releasing power relay 460 and stopping the vibrator. Relay 460 releasing removes the high voltage from transmitter 402, which immediately removes its carrier from the air to release the control station. Relay 340 also at contacts 349″ connects unamplified tone from conductor 326 to the handset receiver, by way of contacts 337 and conductor 522, as an audible signal. Relay 340, further, at contacts 347 closes the circuit to the tuning motor 600 over contacts 354 and conductor 609. The tuner accordingly makes one rotation and stops, this rotation being without effect except to release relay 350, however, unless the squelch relay should operate before its completion, in which case it might cause the station to be tuned to a new channel.

In any event, the mobile station is now locked out, since its seizure relay cannot be operated while contacts 646 of the time are open. The calling mobile subscriber will accordingly, upon noting the audible and visual signals, restore the handset to the hookswitch. Contacts 535 will then open and release the timer clutch 636, which will thereupon release the shaft 639. The spring 637 will then return the shaft 639 and its cams to the illustrated normal position, thereby extinguishing the lamp 517 and restoring the station to normal condition.

Call timing, as previously indicated, is a function of the same timer which is started in response to removal of the handset, whether to initiate or to answer a call. In the latter case, since the squelch relay 320 is already operated when the handset is removed, the contacts 646 are shunted at contacts 324, and the circuit for contacts 647 is open at contacts 323'. The out-of-range timer is therefore ineffective, just as it is on an initiated call where the fixed carrier is received back promptly in normal manner. The motor 635 accordingly continues driving the shaft 639 and the associated cams in a clockwise direction. At the conclusion of the conversion, when the mobile subscriber returns the handset to the hookswitch the clutch and motor circuits are opened, and the cams are again returned to their normal position by the spring 637.

If the conversation continues, however, at the end of a predetermined time, such as 4½ minutes, the two points on the cam 640 close and re-open the contacts 641 and 642 twice in succession. At each closure the contacts 641 complete a tone circuit to the handset receiver, from conductor 326, over conductor 606, contacts 641 and 644, and conductors 619 and 522. At the same time contacts 642 close a circuit to relay 643, which has been made slow to operate by means of an armature end slug on the core. Relay 643 accordingly operates after a brief delay, and cuts off the tone at contacts 644. It is obvious therefore, that the mobile subscriber is warned, by two short tone signals, that 4½ minutes have expired, and that he is about to be disconnected.

Approximately ½ minute later, if the mobile subscriber still has not hung up, the hump on the cam 650 opens the contacts 651 and 652. Contacts 651 thereupon open the circuit to the timer motor, which stops. The clutch 636 remains operated, however, from the switchhook, to hold the cams in place. At the same time, contacts 652 open the circuit to relay 340, which restores. Relay 340 thereupon, at contacts 347 and 345 closes circuits to the tuning motor 600 and the re-searching relay 330, to re-tune the station in the usual manner. Relay 340 also, at its contacts 343 disconnects the handset receiver from the radio receiver output circuit, and at contacts 341 disconnects the vibrator 490 and the power relay 460. The latter deenergizes the handset transmitter and removes the high voltage from the radio transmitter 402, which in response thereto quickly removes its carrier from the air. Squelch relay 320 restores, as soon as the mobile station is re-tuned to a new free channel.

The mobile station remains locked out, however, since the seizure relay 340 cannot be operated as long as contacts 652 on the timer remain open, which is as long as the hookswitch contacts remain closed. As soon as the mobile subscriber hangs up, however, the hookswitch contacts open, and release the timer clutch 636. The clutch 636 in turn releases the shaft 639, whereupon the restoring spring 637 returns the cams to the illustrated normal position, thereby causing re-closure of contacts 651, 652 and 646, and the restoration of the mobile unit to normal operating condition.

The invention having now been described, what is considered new and is desired to be secured by Letters Patent outlined in the following claims.

What is claimed is:

1. In a telephone system for extending calls in either direction between a telephone exchange and a group of isolated subscriber stations over a plural-channel radio link, said isolated stations being isolated from each other and from said telephone exchange, a tunable radio receiver and a tunable radio transmitter at each of said isolated stations for completing such calls, a multi-contact switch at each of said isolated stations operated responsive to receipt of a signal from the telephone exchange, and means responsive to the operation of each switch for tuning said transmitters and receivers at all said isolated stations not engaged in a call to an idle channel of said plural channel radio link.

2. In a telephone system for extending calls between a telephone exchange and a group of isolated subscriber stations over a multi-channel radio link, said isolated stations being isolated from each other and from said telephone exchange, a tunable radio receiver at each said isolated station for receiving such calls, means at said exchange for selecting the idle channels of said radio link in a given predetermined order for the extension of calls thereover, a multi-contact switch at each of said isolated stations operated responsive to the extension of a call over said idle channel, and means responsive to the operation of each switch for tuning said receivers at all said isolated stations not engaged in a call to another idle channel.

3. In a telephone system as in claim 2, means for operating said switches responsive to the release of such calls at all of said isolated stations not engaged in a call, and means responsive to the operation of said switches for tuning said receivers to the lowest idle channel in the said given predetermined order.

4. In a telephone system as in claim 2, a power switch at each said isolated station for putting such station in service, and means responsive to the closure of such switch at any one of said stations for causing such station to be tuned at once to the next channel to be selected, independently of any further action by the isolated subscriber.

5. In a telephone system for extending calls between a telephone exchange and any one of a group of isolated subscriber stations over a multi-channel radio link, a tunable radio receiver at each said isolated station, means for seizing all of said isolated stations simultaneously from said exchange over one of the channels of said radio link, means at said seized isolated stations responsive to the passage over said one channel of impulses representing digits in the call number of a wanted one of said isolated stations for signalling said wanted station, and means also responsive to the passage over said one channel of impulses representing digits in the call number of a wanted one of said isolated stations for automatically retuning the radio receivers at the unwanted ones of said seized stations to another channel.

6. In a telephone system as in claim 5, means for causing said re-tuning of said unwanted stations before all of the digits of the call number have been passed over said link.

7. In a telephone system as in claim 5, means at said unwanted stations for causing said retuning of such station responsive to the receipt thereat of the first digit indicating that the call is not for such station.

8. In a telephone system for extending calls between a telephone exchange and any one of a plurality of isolated subscriber stations over a plural-channel radio link, a tunable radio receiver at each said isolated station, means for seizing all idle ones of said isolated stations simultaneously from said exchange over any one of the channels of said radio link, means at said seized stations responsive to the passage over said one channel of impulses representing digits in the call number of a called one of said isolated stations for signalling only such called station, and means for automatically re-tuning the radio receivers at the uncalled ones of said stations to the lowest numbered idle one of said channels.

9. In a telephone system as in claim 8, means responsive to the release of said call for re-tuning said called station and said uncalled stations to the then lowest numbered free channel.

10. A telephone system as in claim 8, in which said plural-channel radio link comprises two-way channels exceeding two in number.

11. In a telephone system for extending calls between a group of isolated subscriber stations and a telephone exchange over a multi-channel radio link, said isolated stations being isolated from each other and from said telephone exchange, a tunable radio transmitter at each said isolated station for extending calls therefrom over any one of the channels of said radio link, a multi-contact switch at each of the idle isolated stations operated responsive to the extension of such a call over one of said channels from any one of said isolated stations, and means responsive to the operation of said switches for immediately re-tuning the idle isolated stations to a different one of said channels.

12. In a telephone system as in claim 11, means at each said isolated station for giving a busy signal in case a call is attempted thereat while all of said channels are busy.

13. In a telephone system for extending calls in either direction between a telephone exchange and a group of isolated subscriber stations over a multi-channel radio link in response to dial pulses, tunable radio instruments at each said isolated station normally tuned to a single standby one of the channels of said link, a fixed radio station having a radio transmitter thereat for each one of said channels, means for seizing said fixed station from said exchange, means responsive to such seizure for causing the fixed transmitter of the said standby channel to emit a modulated carrier wave, means at said isolated stations responsive to said modulated carrier for preparing said stations to receive impulses over said standby channel, means for seizing said fixed station over said radio link from any one of said isolated stations, means responsive to such seizure for preparing said fixed station to receive impulses over said radio link and for causing the fixed transmitter of said standby channel to emit an unmodulated carrier wave, and means at said isolated stations responsive to such unmodulated carrier for causing the radio instruments at all idle isolated stations to be tuned at once to a new standby channel.

14. In a telephone system as in claim 13, means for continuing the emission of said carrier wave for the duration of the call for the transmission of speech, and means for removing said modulation after a brief interval to clear said carrier for the transmission of speech.

15. In a telephone system as in claim 13, means responsive to the release of any of said calls for causing certain of said transmitters at said fixed radio station to emit the corresponding unmodulated carrier wave briefly, and means responsive to such brief emission for re-tuning all of the idle isolated stations.

16. In a telephone system for extending calls in either direction between a telephone exchange and any one of a group of isolated subscriber stations over a multichannel radio link, tunable radio instruments at each said isolated station, an automatic tuner at each said isolated station for keeping the idle ones of said stations tuned to an idle one of the channels of said radio link ready to make or receive calls over such idle channel, call initiating means at each of said isolated stations, means for operating said tuners at all idle ones of said stations responsive to the extension and release of a call in either direction, and means responsive to the operation of said tuner at any one of said stations for disabling said call initiating means until such tuning operation has been completed thereat.

17. In a telephone system as in claim 16, a circuit for connecting a busy tone to the receiver at each said isolated station, and means at each said isolated station for completing said circuit for giving a busy signal in case a call is attempted thereat while a tuning operation is in progress thereat.

18. In a telephone system for extending calls in either direction between any one of a first group of subscriber stations connected to a telephone exchange and any one of a second group of isolated subscriber stations over a plural-channel radio link in response to dialled impulses from said subscriber stations repeated over said link, a radio receiver and a radio transmitter at each of said isolated stations, a multi-contact switch at each of said isolated stations, an automatic tuner at each of said isolated stations operated responsive to operation of the corresponding switch for keeping said receiver and transmitter tuned to an idle one of the channels of said link at all idle ones of said isolated stations, means for operating said switches at all idle isolated stations responsive to the extension of such a call to a called one of said isolated stations; means for operating said switches at all idle isolated stations responsive to the release of such a call to one of said isolated stations; means for operating said switch at a called one of said isolated stations responsive to the release of such called station; means for operating said switches at all idle isolated stations responsive to the extension of such a call from a calling one of said isolated stations; means for operating said switches at all idle isolated stations responsive to the release of such a call from one of said isolated stations; and means for operating said switch at a calling one of said isolated stations responsive to the release of such calling station.

19. In a telephone system for extending calls over a radio link between any one of a group of isolated subscriber stations and a telephone exchange, a fixed radio station associated with said exchange, a radio transmitter at said fixed station, means responsive to the initiation of a call at any one of said isolated stations for seizing said fixed station over said link, means responsive to such seizure for causing said transmitter to emit a carrier wave, means at said calling station responsive to the receipt of said carrier thereat for preparing such station to complete the call, a timer at said calling station, contacts operated by said timer for disabling said calling station and releasing said fixed station within a given time following the initiation of the call, and means at said calling station operated responsive to the receipt of said carrier thereat within the given time for rendering the operation of sad contacts ineffective.

20. In a telephone system as in claim 19, a call initiating switch at said calling station, means responsive to the operation of said switch for initiating said call, means for maintaining said timer contacts operated for the duration of a normal call, means for maintaining said timer contacts operated indefinitely in case said station has been disabled thereby, and means responsive to the release of said call initiating switch for releasing said contacts and for re-enabling such calling station.

21. In a telephone system as in claim 19, a shaft for said timer, a cam on said shaft for operating said contacts, another cam on said shaft for disabling said isolated station after a further time interval in case said contacts have been rendered ineffective and the extended call is not released within said further interval, a motor and a clutch for driving said shaft and said cams, a call initiating switch at said isolated station, said motor and clutch operated responsive to the operation of said switch, means responsive to the disabling of said station by either of said cams for stopping said motor, means responsive to the release of said switch for releasing said clutch, and means responsive to the release of said clutch for restoring said shaft and said cams to their normal position.

22. In a telephone system for extending calls over a plural-channel radio link in either direction between a telephone exchange and any one of a group of isolated subscriber stations, a radio transmitter and a radio receiver at each said isolated station normally tuned to an idle standby channel of said link, a call initiating and answering switch at each said isolated station, means responsive to the operation of said switch at any calling one of said isolated stations for extending a connection from such station to said telephone exchange over said standby channel, means responsive to the operation of said switch at any called one of said isolated stations for completing a call extended thereto from said exchange over said standby channel, a call timer for disabling said calling station and releasing such calls in case they are not terminated within a given time, means responsive to such forced release for re-tuning said station's radio transmitter and receiver to an idle standby channel, and means responsive to the subsequent release of said switch for re-enabling such station to make and receive calls over such channel.

23. In a telephone system for extending calls over a plural-channel radio link between a telephone exchange and any one of a group of isolated subscriber stations, a radio receiver at each said isolated station normally tuned to an idle standby channel of said link, a call answering switch at each said isolated station, means responsive to the operation of said switch at any called one of said isolated stations for completing a call extended thereto from said exchange over said standby channel, a call timer for disabling said called station and releasing the call in case it persists beyond a given time limit, means responsive to such forced release for re-tuning such station's radio receiver to a new standby channel, and means responsive to subsequent release of said switch for re-enabling said station to receive calls over said new standby channel.

24. In a telephone system for extending calls over a 3-channel radio link between a group of subscriber stations connected to an exchange and a group of isolated subscriber stations in response to dial pulses received from any one of said stations, a radio control station connected to said exchange and having a control circuit thereat for each channel of said link, a single-channel radio transmitter in each said control circuit, a 3-channel radio transmitter at each said isolated station, means for causing successive calls to select said channels in a definite sequence, a tuner at each said isolated station operative to re-tune the transmitter of such station to stand by on the next channel to be selected by a call, means for seizing the control circuit corresponding to such standby channel responsive to the extension of a call to said control station from any one of said connected stations or from any one of said isolated stations, means responsive to such seizing for causing the associated control station transmitter to emit a carrier wave, a modulating frequency momentarily impressed on said carrier only responsive to seizure of said control circuit from one of said groups of subscriber stations, and means for holding all idle isolated stations on said standby channel on an outward call to any one of such stations until the identity of the unwanted ones of such stations has been established and for operating said tuners immediately at all idle isolated stations on an inward call from one of such stations in accordance with the presence or absence of said modulating frequency on said carrier wave.

25. In a telephone system as in claim 24, means at a busy one of said isolated stations responsive to the release of a call at such station for operating such station's tuner to re-tune such station's transmitter, means at said control station responsive to the release of said control circuit for causing the control station transmitter associated with the second choice ones of said channels to emit their carrier waves briefly, and means responsive to reception of either of said carriers at the other ones of said isolated stations for operating the tuners thereat to re-tune such stations' transmitters.

26. In a telephone system as in claim 24, a device at each of said isolated stations operated at a busy one of such stations responsive to release of a call by such station for operating such station's tuner, means at said control station operative in response to the release of any busy one of said control circuits for causing the control station transmitters associated with the second choice ones of said channels to emit their carrier waves briefly, means responsive to reception of either of said carrier waves at any other ones of said isolated stations for operating such stations' tuners, means at said control stations for guarding said control circuits against seizure from any of said connected stations while said re-tuning carrier waves are being emitted, and means at said isolated stations for guarding said control circuits against seizure from any one of such isolated stations while the tuner thereof is in operation.

27. In a telephone system as in claim 26, means for starting the tuners of all idle and released isolated stations at approximately the same time responsive to the release of a call at any one of said isolated stations.

28. In a plural channel telephone system, an isolated subscriber station having a plural digit call number, a plural channel radio receiver at said station normally tuned to an idle one of said channels, a squelch relay at said station operative in response to receipt of a radio carrier wave of the frequency to which said receiver is tuned, a re-tuning relay operative in response to the operation of said squelch relay for tuning said receiver to a different one of said channels, a hold relay operative in response to receipt of a momentary modulating wave with said carrier for blocking the operation of said re-tuning relay from said squelch relay, a kickoff relay operated in response to impulses received over said carrier representing a digit not included in said call number, means responsive to operation of said kickoff relay for operating said re-tuning relay, and means for making said re-tuning relay slow to operate when operated from said squelch relay, and quick to operate when operated from said kickoff relay.

29. In a plural channel telephone system, a mobile station having a plural channel radio receiver normally tuned to the first idle channel of said system, an automatic cyclic tuner at said station, a squelch relay at said station operative in response to reception thereat of a radio carrier wave of the frequency to which said receiver is tuned at the time, means responsive to operation of said squelch relay for operating said tuner for one cycle of operation, means controlled by said squelch relay and said tuner during said one cycle for testing all of said channels successively and for tuning said receiver to the first one of said channels which tests idle during said cycle, an assigned digital call number for said station, means for transmitting impulses representing the digits of said call number and other call numbers over said carrier wave, a kickoff relay at said station operated in response to impulses received over said carrier representing a digit not included in said station's call number, and means responsive to the operation of said kickoff relay for operating said tuner for one cycle of operation.

30. In a plural channel telephone system, a mobile station having a plural channel radio receiver normally tuned to the first idle channel of said system, an automatic cyclic tuner at said station, a squelch relay at said station operative in response to reception thereat of a radio carrier wave of the frequency to which said receiver is tuned at the time, means responsive to operation of said squelch relay for operating said tuner for one cycle of operation, means controlled by said squelch relay and said tuner during said one cycle for testing all of said channels successively and for tuning said receiver to the first of said channels which tests idle during said cycle, a set of cams for said tuner, a motor for driving said cams one revolution during each said cycle of operation, and contacts controlled by said cams during said one revolution for testing said channels and for tuning said receiver in accordance with the results of said tests.

ROSWELL H. HERRICK.

REFERENCES CITED

The following references are of record in the file of this patent:

UNITED STATES PATENTS

| Number | Name | Date |
|---|---|---|
| 2,064,958 | Taylor | Dec. 22, 1936 |
| 2,137,023 | Monk | Nov. 15, 1938 |
| 2,214,256 | Peterson | Sept. 10, 1940 |
| 2,265,056 | Bowers | Dec. 2, 1941 |
| 2,333,039 | Peterson | Oct. 26, 1943 |
| 2,457,434 | Bartelink | Dec. 28, 1948 |
| 2,479,701 | Ress | Aug. 23, 1949 |

FOREIGN PATENTS

| Number | Country | Date |
|---|---|---|
| 570,415 | Great Britain | July 5, 1945 |